United States Patent
Singh et al.

(10) Patent No.: US 10,782,843 B2
(45) Date of Patent: Sep. 22, 2020

(54) MOBILE TERMINAL, WATCH-TYPE MOBILE TERMINAL AND METHOD FOR CONTROLLING THE SAME

(71) Applicant: LG ELECTRONICS INC., Seoul (KR)

(72) Inventors: Harish Chandra Singh, Seoul (KR); Revathi B, Seoul (KR); Srividya Kvn, Seoul (KR); Pavan Nag R P, Seoul (KR)

(73) Assignee: LG Electronics Inc., Seoul (KR)

( * ) Notice: Subject to any disclaimer, the term of this patent is extended or adjusted under 35 U.S.C. 154(b) by 1139 days.

(21) Appl. No.: 15/016,020

(22) Filed: Feb. 4, 2016

(65) Prior Publication Data

US 2017/0031534 A1    Feb. 2, 2017

(30) Foreign Application Priority Data

Jul. 30, 2015  (KR) .................. 10-2015-0107868

(51) Int. Cl.
*G06F 3/0483* (2013.01)
*H04N 21/4402* (2011.01)
(Continued)

(52) U.S. Cl.
CPC ............ *G06F 3/0481* (2013.01); *G06F 1/163* (2013.01); *G06F 3/017* (2013.01); *G06F 3/0488* (2013.01);
(Continued)

(58) Field of Classification Search
CPC .... G06F 3/0481; G06F 3/0482; G06F 3/0483; G06F 9/444; G06F 3/04817;
(Continued)

(56) References Cited

U.S. PATENT DOCUMENTS 6,453,336 B1 * 9/2002 Beyda ..................... H04L 29/06
                                                         709/204
7,290,698 B2 * 11/2007 Poslinski ........... H04N 5/44513
                                                         235/375

(Continued)

FOREIGN PATENT DOCUMENTS

CN      104219714 A     12/2014
EP      2469754 A2      6/2012
EP      2899952 A1      7/2015

*Primary Examiner* — Arpan P. Savla
*Assistant Examiner* — Erik V Stitt
(74) *Attorney, Agent, or Firm* — Dentons US LLP

(57) ABSTRACT

The present invention relates a mobile terminal, a watch-type mobile terminal and a method of controlling therefor. More specifically, the present invention relates to a method of playing a video by streaming according to data capacity allocated to the mobile terminal or the watch-type mobile terminal. In order to achieve the aforementioned object or other object, according to one embodiment of the present invention, a mobile terminal includes a display unit, and a controller, wherein the controller is configured to: display a first indicator on a progress bar prior to playing a video, the first indicator indicating an anticipated point at which the mobile terminal is expected to exceed an amount of data capacity allocated to the mobile terminal by a mobile communication network, and display a second indicator on the progress bar while playing the video, the second indicator indicating a point at which the mobile terminal will exceed the data capacity allocated to the mobile terminal by the mobile communication network.

22 Claims, 19 Drawing Sheets

(51) Int. Cl.
    *G06F 3/0481*     (2013.01)
    *H04L 29/06*     (2006.01)
    *G06F 3/0484*     (2013.01)
    *G06F 3/0488*     (2013.01)
    *G06F 3/01*     (2006.01)
    *G06F 1/16*     (2006.01)
    *H04M 1/725*     (2006.01)
    *H04L 29/08*     (2006.01)

(52) U.S. Cl.
    CPC ...... *G06F 3/04842* (2013.01); *G06F 3/04847* (2013.01); *H04L 65/60* (2013.01); *H04L 67/36* (2013.01); *H04M 1/7253* (2013.01); *H04M 1/72522* (2013.01); *H04M 1/72544* (2013.01); *H04M 2250/22* (2013.01)

(58) Field of Classification Search
    CPC .. H04N 5/44543; H04N 21/4622; H04N 5/44; G11B 27/34
    USPC .......................................................... 715/719
    See application file for complete search history.

(56) References Cited

U.S. PATENT DOCUMENTS

| | | | | |
|---|---|---|---|---|
| 7,450,820 B2* | 11/2008 | Uenaka | ................ | G11B 27/105 386/239 |
| 7,693,391 B2* | 4/2010 | Hamada | ................ | G11B 27/031 386/241 |
| 8,229,287 B1* | 7/2012 | Duggal | ................ | H04N 5/76 386/343 |
| 8,307,286 B2* | 11/2012 | Sterner | ................ | G06Q 30/00 715/716 |
| 8,340,569 B2* | 12/2012 | Kim | ................ | G11B 27/005 455/3.02 |
| 8,548,304 B2* | 10/2013 | Song | ................ | H04N 5/63 386/328 |
| 8,793,575 B1* | 7/2014 | Lattyak | ................ | G09B 5/062 715/273 |
| 8,898,316 B2* | 11/2014 | Facemire | ................ | H04N 7/15 386/241 |
| 9,148,289 B2* | 9/2015 | Tan | ................ | H04L 12/1827 |
| 2006/0013555 A1* | 1/2006 | Poslinski | ................ | H04N 5/44543 386/243 |
| 2006/0045470 A1* | 3/2006 | Poslinski | ................ | H04N 5/44513 386/297 |
| 2007/0121161 A1* | 5/2007 | Yamada | ................ | H04N 1/00954 358/1.16 |
| 2008/0094466 A1* | 4/2008 | Helvick | ................ | G11B 27/34 348/14.01 |
| 2008/0307348 A1* | 12/2008 | Jones | ................ | G06F 3/04847 715/772 |
| 2008/0320391 A1* | 12/2008 | Lemay | ................ | G06F 3/04886 715/702 |
| 2009/0061841 A1* | 3/2009 | Chaudhri | ................ | H04M 1/72527 455/420 |
| 2009/0073266 A1* | 3/2009 | Abdellaziz Trimeche | ................ | G11B 27/28 348/180 |
| 2009/0129741 A1* | 5/2009 | Kim | ................ | G11B 27/034 386/328 |
| 2009/0187825 A1* | 7/2009 | Sandquist | ................ | G06F 16/70 715/719 |
| 2013/0132854 A1* | 5/2013 | Raleigh | ................ | G06F 3/0482 715/738 |
| 2015/0146012 A1 | 5/2015 | Shipley et al. | | |
| 2016/0149864 A1* | 5/2016 | Flawn | ................ | G06F 16/93 726/22 |

* cited by examiner

FIG. 5
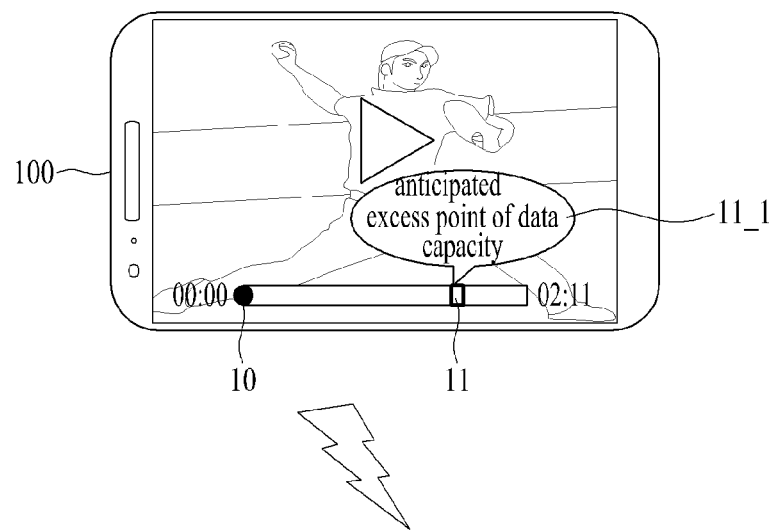
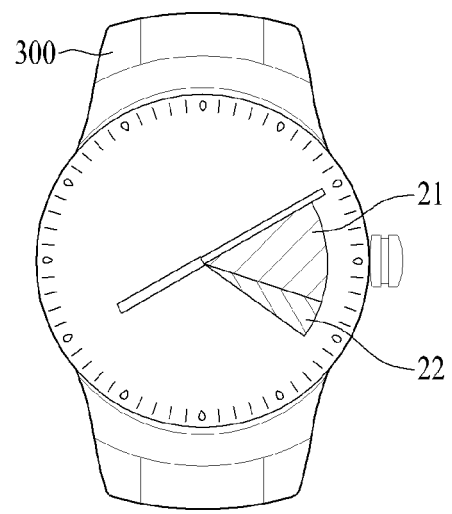

FIG. 7
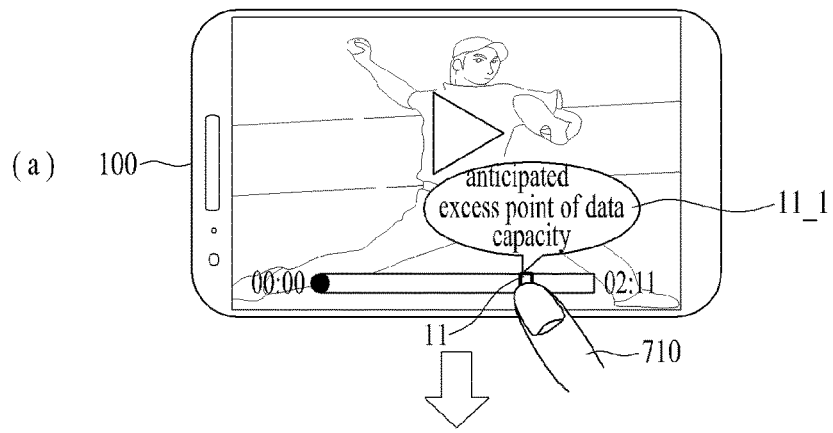
(a)
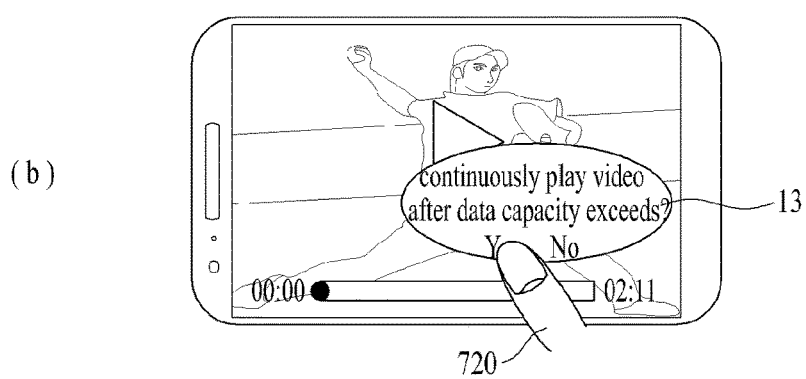
(b)
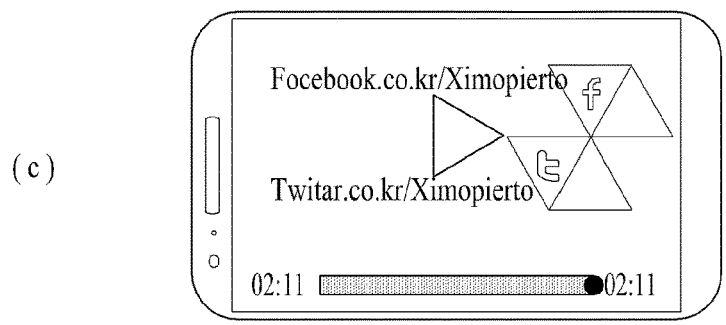
(c)
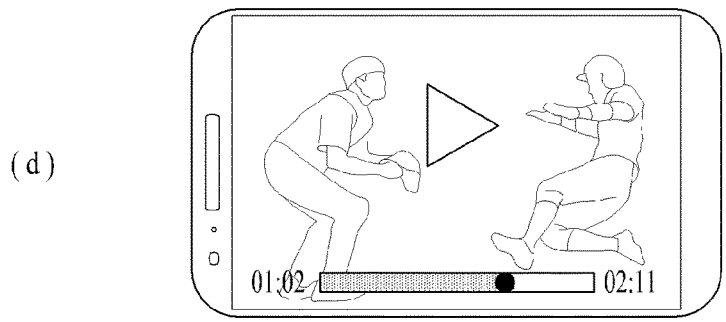
(d)

FIG. 9
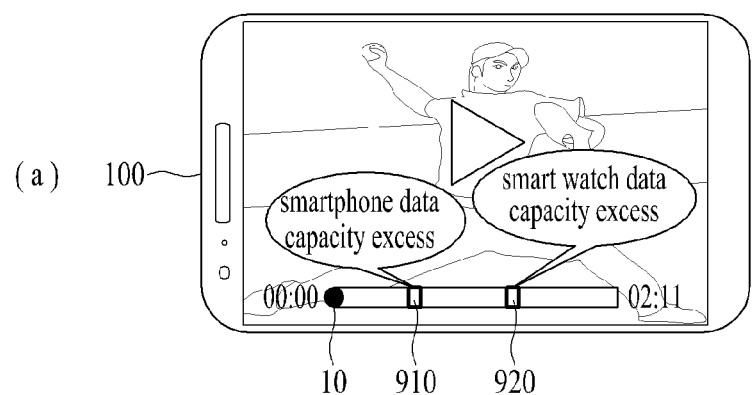
(a)
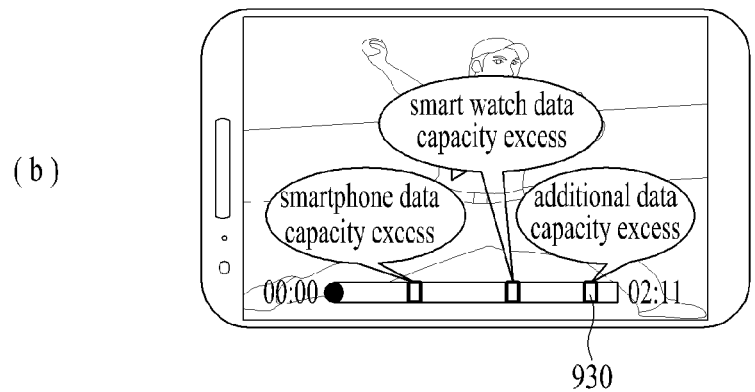
(b)

FIG. 15
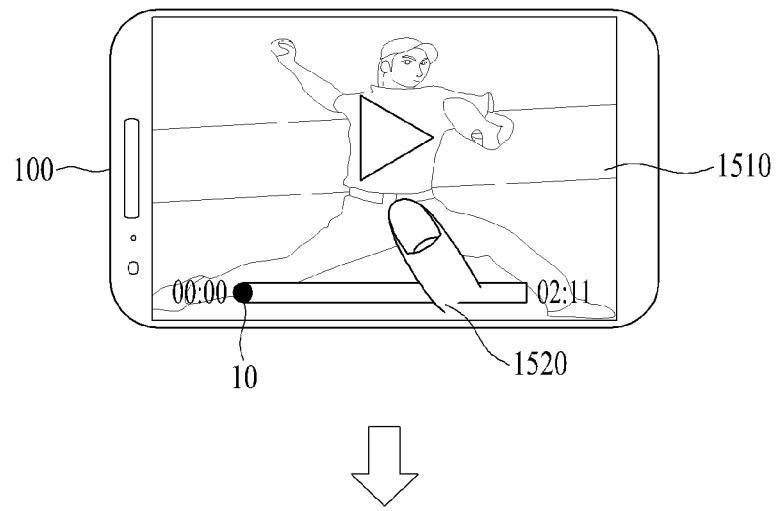
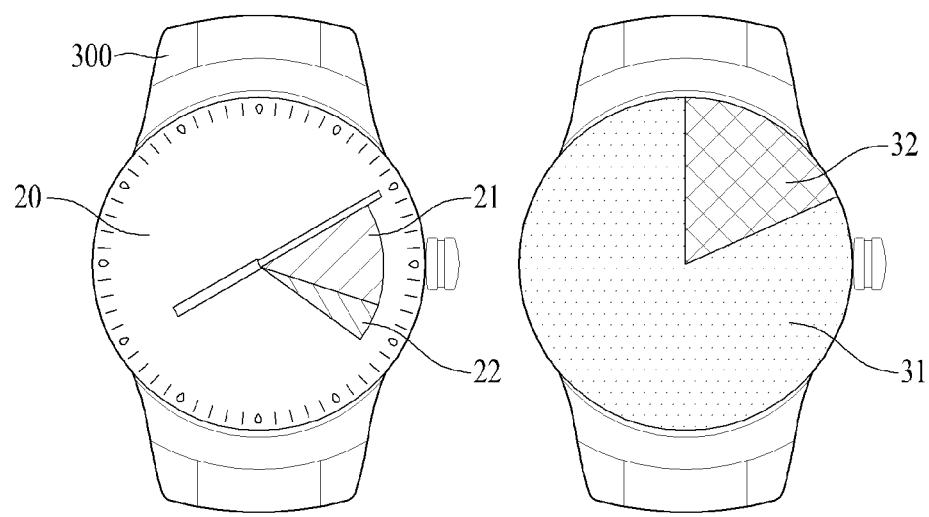
(a)            (b)

FIG. 16
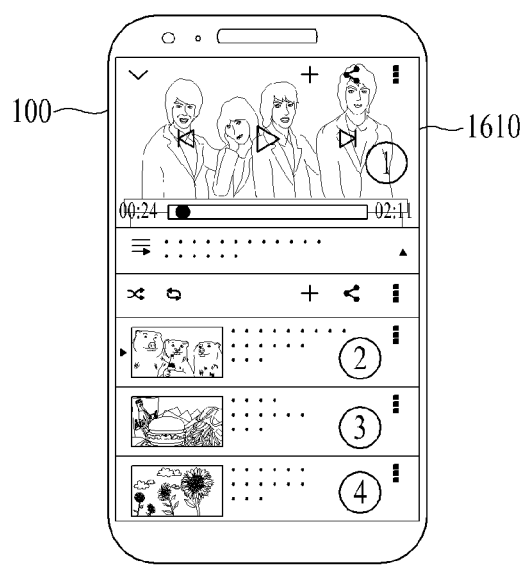
(a)
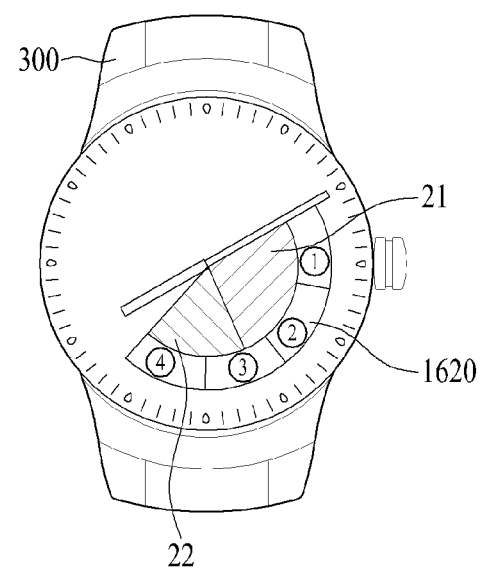
(b)

MOBILE TERMINAL, WATCH-TYPE MOBILE TERMINAL AND METHOD FOR CONTROLLING THE SAME

Pursuant to 35 U.S.C. § 119(a), this application claims the benefit of earlier filing date and right of priority to Korean Application No. 10-2015-0107868, filed on Jul. 30, 2015, the contents of which are hereby incorporated by reference herein in their entirety.

BACKGROUND OF THE INVENTION

Field of the Invention

The present invention relates to a mobile terminal, a watch-type mobile terminal and a method of controlling therefor. More particularly, the present invention relates to a method of playing a video by streaming according to data capacity allocated to a mobile terminal or a watch-type mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, when a video is played by streaming in a mobile terminal, since a user is unable to know a section exceeding data capacity limit, a charging section may occur in the middle of watching the video irrespective of an intention of the user.

SUMMARY OF THE INVENTION

Accordingly, an object of the present invention is to address the above-noted and other problems. Another object of the present invention is to provide a mobile terminal configured to inform a user of a section exceeding a data capacity allocated to the mobile terminal in advance, a watch-type mobile terminal and a method of controlling therefor in case that a video is played by streaming in the mobile terminal.

When a video is going to be played in a mobile terminal, another object of the present invention is to provide a watch-type mobile terminal, which is paired with the mobile terminal, configured to inform a user of playable time of the video within a limit of data capacity allocated to the mobile terminal, the mobile terminal and a method of controlling therefor.

The other object of the present invention is to provide a watch-type mobile terminal, which is paired with a mobile terminal, capable of controlling image quality of a video to be played in the mobile terminal, a request for insufficient data capacity and the like, the mobile terminal and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment of the present invention, a mobile terminal includes a display unit, and a controller, wherein the controller is configured to: display a first indicator on a progress bar prior to playing a video, the first indicator indicating an anticipated point at which the mobile terminal is expected to exceed an amount of data capacity allocated to the mobile terminal by a mobile communication network, and display a second indicator on the progress bar while playing the video, the second indicator indicating a point at which the mobile terminal will exceed the data capacity allocated to the mobile terminal by the mobile communication network.

To further achieve these objects and other advantages and in accordance with the purpose of the invention, as embodied and broadly described herein, according to a different embodiment of the present invention, a watch-type mobile terminal includes a display unit, a sensing unit, a communication unit configured to communicate with an external device, and a controller, wherein the controller is configured to: receive video playback data from the external device, the video playback data comprising total playback time of a video on the external device, data capacity necessary for playing the video on the external device and information indicating an amount of data capacity allocated to the external device, and display a first indicator indicating an amount of time for playing a first portion of the video using the data capacity allocated to the external device and a second indicator indicating an amount of time for playing a second portion of the video after the external device exceeds the data capacity allocated to the external device, wherein the data capacity allocated to the external device corresponds to an amount of communication data to which the external device is limited by a mobile communication network. It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 5 is a diagram for an example of a first mobile terminal and a second mobile terminal related to the present invention;

FIG. 7 is a diagram for an example of a menu option displayed according to a playback of a video in a first mobile terminal related to the present invention;

FIG. 9 is a diagram for an example of various indicators displayed in a first mobile terminal related to the present invention;

FIG. 15 is a diagram for an example of controlling a video played in a first mobile terminal by the first mobile terminal or a second mobile terminal related to the present invention;

FIG. 16 is a diagram for an example of controlling a video played in a first mobile terminal by the first mobile terminal or a second mobile terminal related to the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
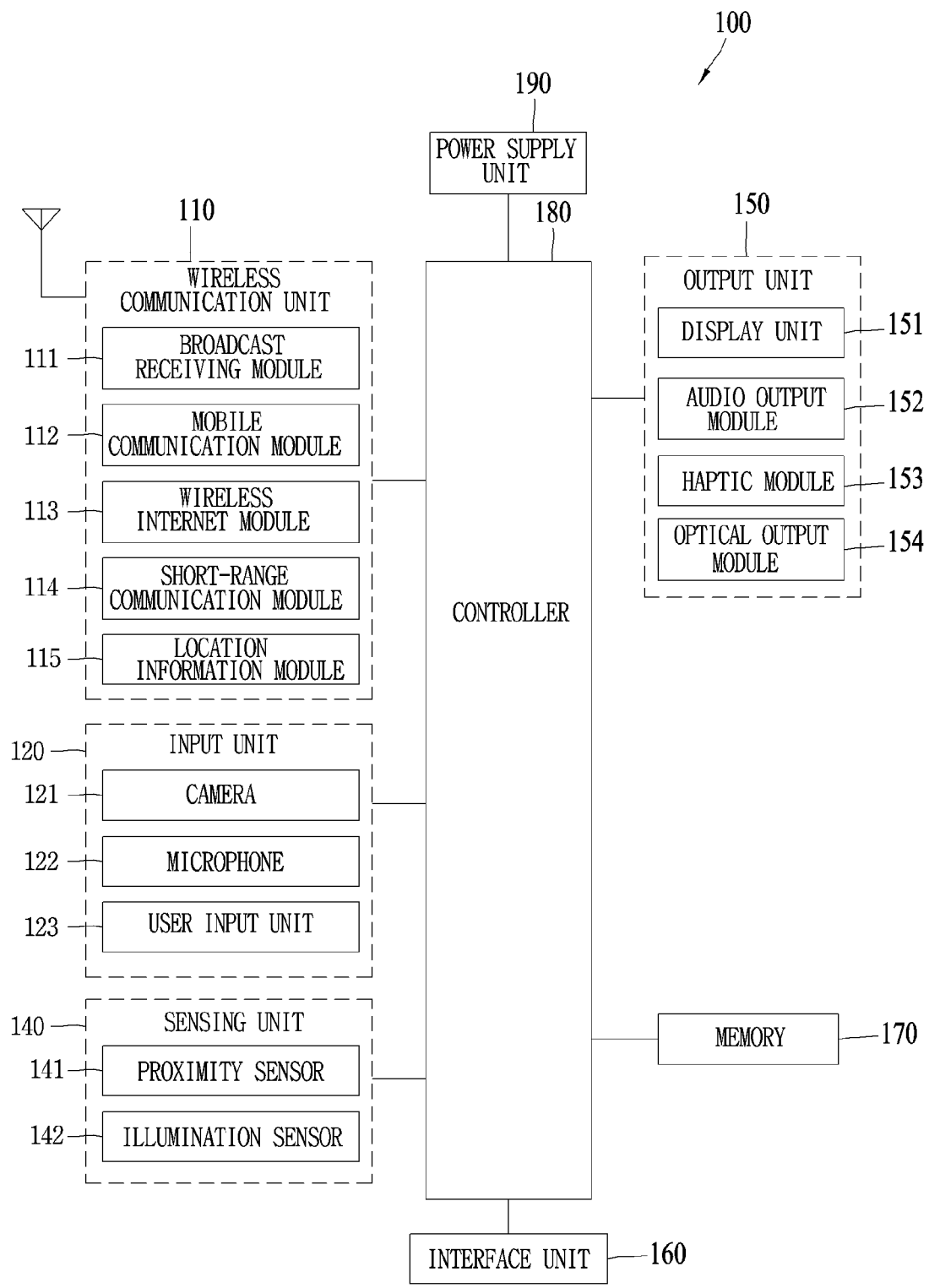
FIG. 1A is a block diagram of a mobile terminal in accordance with the present disclosure.
Figure 1B:
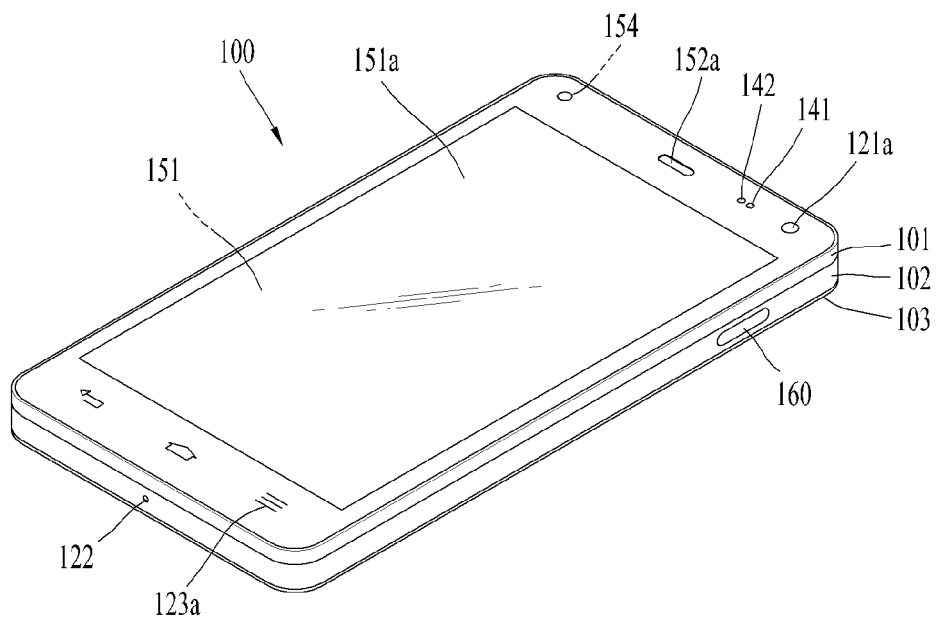
FIGS. 1B and 1C are conceptual views of one example of the mobile terminal, viewed from different directions.
Figure 1C:
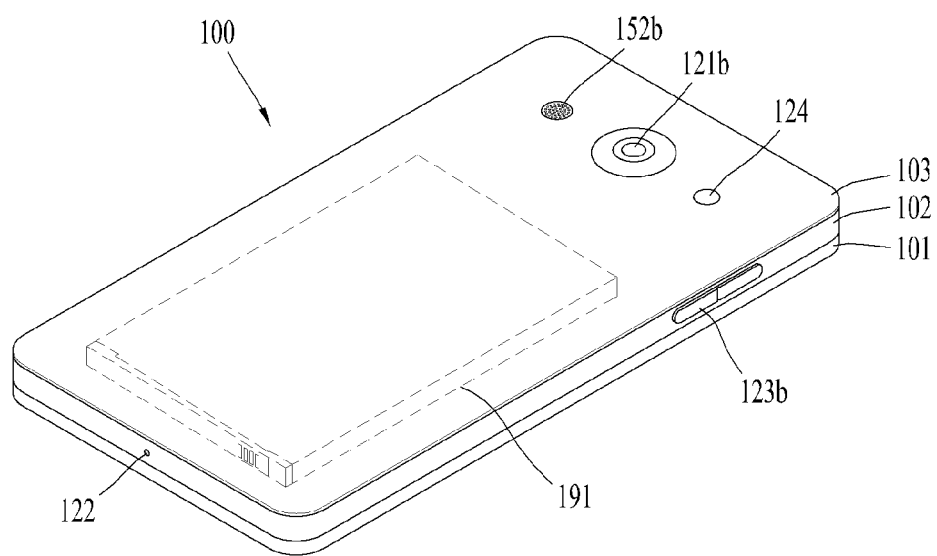

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user in a manner of processing a signal, data, information, and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the aforementioned configuration elements can operate in a manner of cooperating with each other to implement an operation of a mobile terminal, a control of the mobile terminal or a method of controlling the mobile terminal according to various embodiments described in the following. And, the operation of the mobile terminal, the control of the mobile terminal or the method of controlling the mobile terminal can be implemented on the mobile terminal in a manner of executing at least one or more application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

A mobile terminal 100 can include a display unit 151, a first and second audio output unit 152a/152b, a proximity sensor 141, an illumination sensor 142, an optical output unit 154, a first and a second camera 121a/121b, a first and a second operation unit 123a/123b, a microphone 122, an interface unit 160 and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, information processed by a mobile terminal can be displayed using a flexible display. Regarding this, it shall be described in more detail with reference to the attached drawing in the following.

Figure 2:
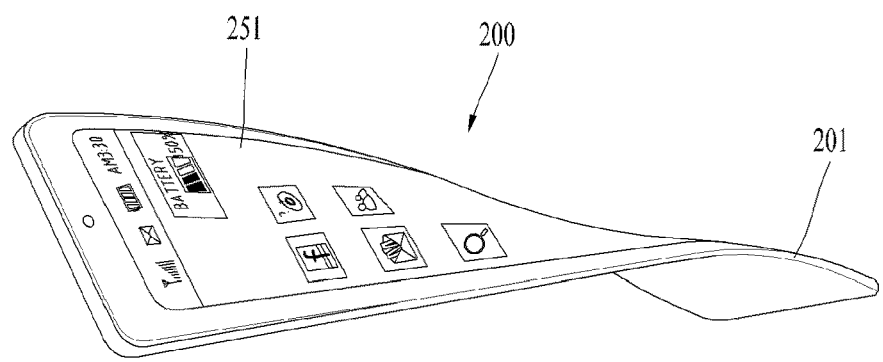
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
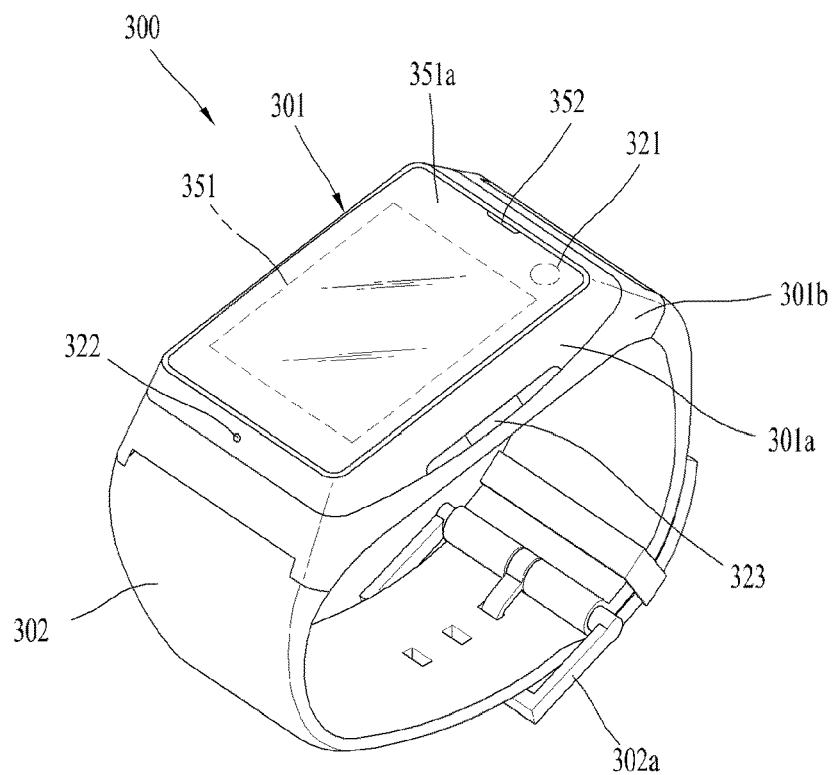
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
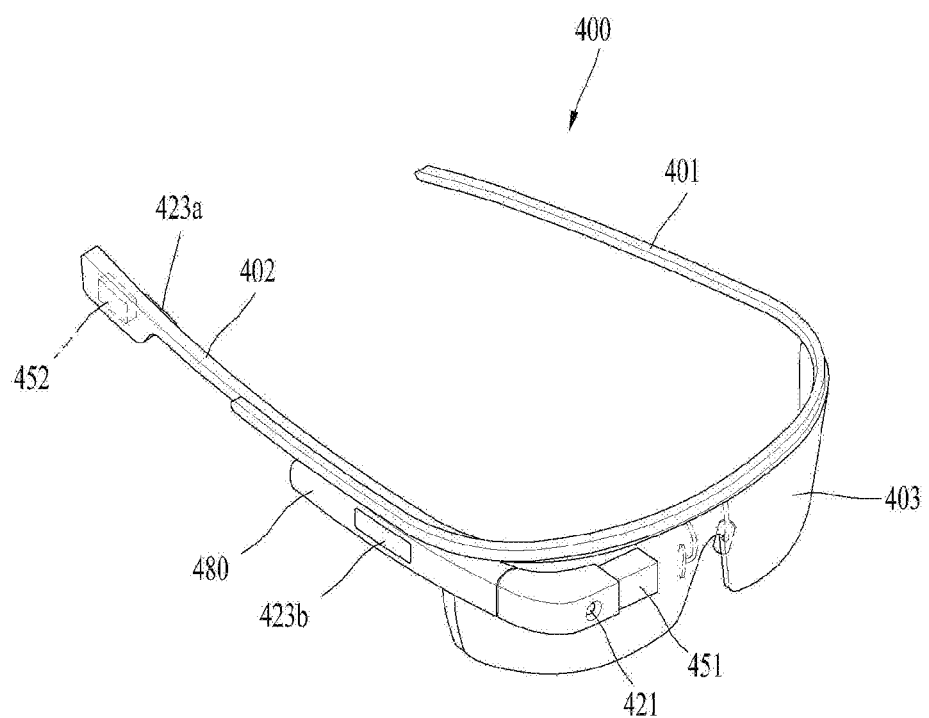
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BS s, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

And, FIG. 5 to FIG. 20 described in the following explains a method of controlling playback of a video based on data capacity allocated to a mobile terminal. A first mobile terminal described in the present invention corresponds to such a mobile terminal as a smartphone and a second mobile terminal may correspond to such a watch-type mobile terminal as a smart watch. In the present invention, assume that the first mobile terminal corresponds to a mobile terminal 100 shown in FIG. 1 and the second mobile terminal corresponds to a watch-type mobile terminal shown in FIG. 3.

In the following embodiments described with reference to FIG. 5 to FIG. 20, operations performed by the first mobile terminal or the second mobile terminal can be controlled by the controller 180 shown in FIG. 1a. For clarity, it is commonly shown and explained that the operations are performed/controlled by the first mobile terminal or the second mobile terminal.

FIG. 5 is a diagram for an example of a first mobile terminal and a second mobile terminal related to the present invention.

First of all, the first mobile terminal 100 can include a display unit, a sensing unit, a communication unit, a controller and the like. In the present invention, the display unit can be implemented by the display unit 151 shown in FIG. 1a. And, in the present invention, the sensing unit can be implemented by the sensing unit 140 shown in FIG. 1a. And, in the present invention, the communication unit can be implemented by the wireless communication unit 110 shown in FIG. 1a. And, in the present invention, a camera can be implemented by the camera 121 shown in FIG. 1a and the controller can be implemented by the controller 180 shown in FIG. 1a.

And, the second mobile terminal 300 can include a display unit, a sensing unit, a communication unit, a controller and the like. In the present invention, the display unit can be implemented by the display unit 351 shown in FIG. 3. And, in the present invention, the sensing unit can be implemented by the sensing unit 140 shown in FIG. 1a or the user input unit 323 shown in FIG. 3. And, in the present invention, the communication unit can be implemented by the wireless communication unit 110 shown in FIG. 1a. And, in the present invention, the controller can be implemented by the controller 180 shown in FIG. 1a.

Meanwhile, the first mobile terminal 100 and the second mobile terminal 300 can perform pairing. In this case, the pairing corresponds to a connection established between the first mobile terminal 100 and the second mobile terminal 300 for transceiving data. If the pairing is performed, the first mobile terminal 100 and the second mobile terminal perform communication access and may be then able to bilaterally transceive data with each other. The pairing can be performed via Bluetooth, NFC (near field communication) or the like.

And, each of the first mobile terminal 100 and the second mobile terminal 300 receives data capacity from a mobile communication network and may be able to perform data communication. In this case, the data capacity may correspond to capacity of communication data capable of being used by the first mobile terminal 100 or the second mobile terminal 300 in the mobile communication network. For instance, if the first mobile terminal 100 or the second mobile terminal 300 uses all data capacity allocated to each device, the first mobile terminal 100 or the second mobile terminal 300 can further use communication data under a condition of additional charging. And, for example, if the first mobile terminal 100 or the second mobile terminal 300 uses all data capacity allocated to each device, data communication can be shut off to make the data communication to be no more available. In the present invention, assume that each device can further use data capacity although data capacity allocated to each device is all used up.

In the present invention, the first mobile terminal 100 can play a video. More specifically, the first mobile terminal 100 can play a video by streaming. In this case, the streaming play corresponds to not a case of separately downloading a video and storing the video in a memory or an external memory of the first mobile terminal but a case of receiving video data via a network in real time and playing the video data. If a video is currently playing or is to be played, the first mobile terminal 100 can display a progress bar 10. The progress bar 10 can display an indicator indicating total playback time, current playback time and a current playback position of a video.

And, the first mobile terminal 100 can calculate data consumption of a video to be played based on allocated data capacity. In this case, as shown in FIG. 5, the first mobile terminal 100 can display a first indicator 11 indicating an anticipated point for excess of data capacity allocated to the first mobile terminal on the progress bar 10. Regarding this, it shall be described again with reference to FIG. 6.

Meanwhile, if pairing is performed between the first mobile terminal 100 and the second mobile terminal 300, the second mobile terminal 300 can receive a video playback data from the first mobile terminal 100. In this case, the video playback data can include total playback time of a video 30 to be played or currently playing in the first mobile terminal 100, data capacity necessary for playing the video 30, data capacity allocated to the first mobile terminal 100 and the like.

In this case, as shown in FIG. 5, the second mobile terminal 300 can display a first indicator 21 indicating time capable of playing a video using data capacity of the first mobile terminal 100 and a second indicator 22 indicating time of playing the video after the data capacity of the first mobile terminal 100 exceeds. Regarding this, it shall be explained again with reference to FIG. 10.

In the following, in FIG. 6 to FIG. 9, an indicator displayed on a progress bar based on data capacity allocated to the first mobile terminal 100 is explained in case that a video is currently playing or is to be played in the first mobile terminal 100.

Figure 6:
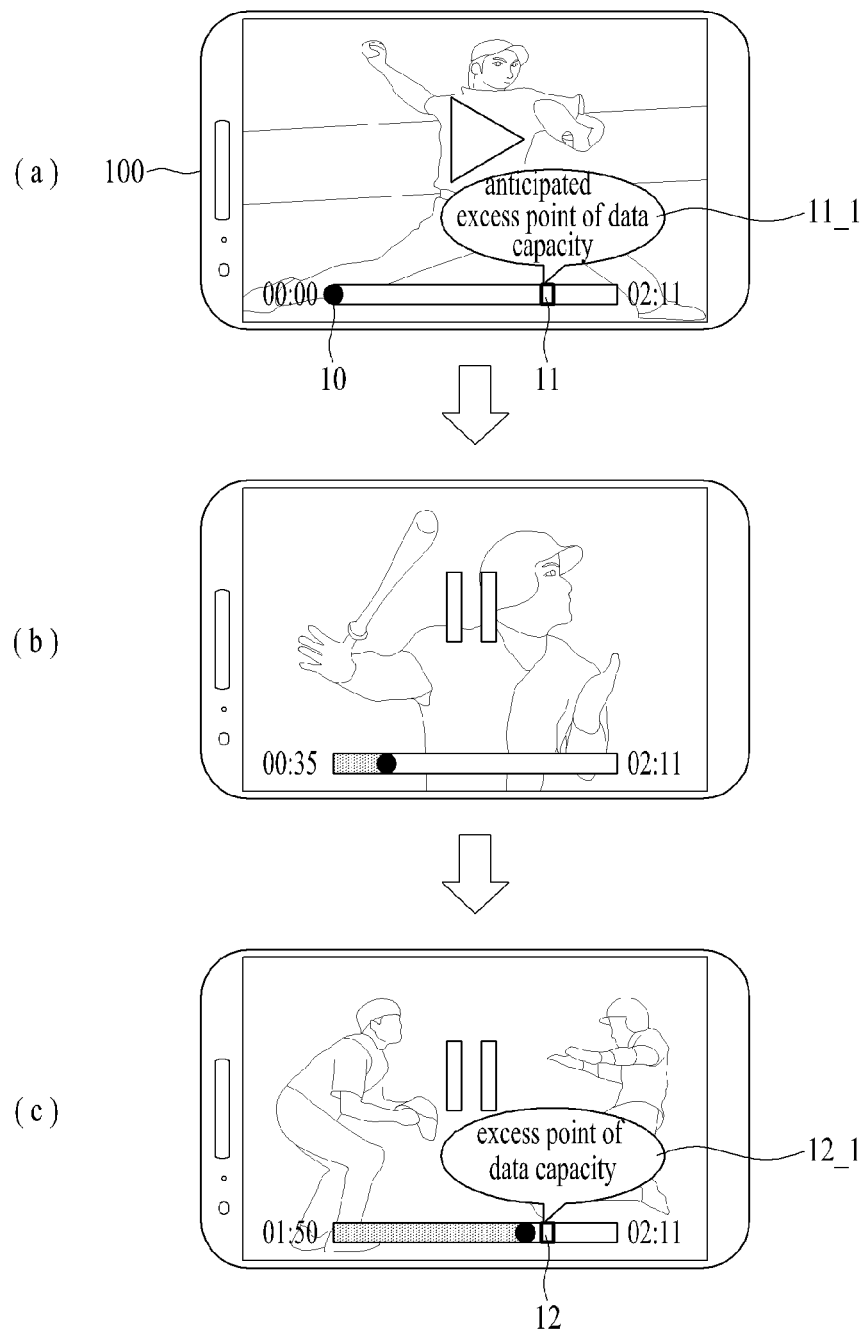
FIG. 6 is a diagram for an example of an indicator displayed according to a playback of a video in a first mobile terminal related to the present invention.

First of all, FIG. 6 is a diagram for an example of an indicator displayed according to a playback of a video in a first mobile terminal related to the present invention.

As shown in FIG. 6(a), the first mobile terminal 100 may be in a state that a video is to be played. For example, the mobile terminal can display an image corresponding to a first frame of the video to be played on the display unit.

In this case, in the state that the video is to be played, the first mobile terminal 100 can calculate data capacity necessary for playing the video. And, the first mobile terminal 100 can compare data capacity allocated to the first mobile terminal 100 with data capacity necessary for playing the video by streaming. In this case, the data capacity allocated to the first mobile terminal 100 may correspond to an amount of data capacity permitted to the first mobile terminal 100 in a mobile communication network.

If the data capacity necessary for playing the video is greater than the data capacity allocated to the first mobile terminal 100, the first mobile terminal 100 can display a first indicator 11 indicating an anticipated point of data capacity excess on a progress bar. In this case, the first indicator 11 can be displayed on the progress bar 10 in a bar form. And, the first indicator 11 can include a first auxiliary indicator 11_1. As shown in FIG. 6(a), the first auxiliary indicator 11_1 can be displayed on one side among a top, a bottom, a left and a right side of the first indicator 11. And, the first auxiliary indicator 11_1 can indicate a meaning of a point at which the first indicator 11 is displayed.

For example, in an embodiment of FIG. 6(a), the first auxiliary indicator 11_1 can display 'data capacity excess anticipated point' in a form of a text balloon. Besides, the first auxiliary indicator 11_1 can be displayed in various ways. Meanwhile, although it is not depicted in FIG. 6(a), if the data capacity necessary for playing the video is less than the data capacity allocated to the first mobile terminal 100, the first mobile terminal 100 does not display the first indicator 11 on the progress bar.

Subsequently, as shown in FIG. 6(b), the first mobile terminal 100 can play a video. In this case, as shown in FIG. 6(b), the first mobile terminal 100 can eliminate the first indicator and the first auxiliary indicator before the video is played. This is because, if the first indicator comes into the sight of a user while the video is playing, the user may feel inconvenience for watching the video. Meanwhile, although it is not depicted in FIG. 6(b), the first mobile terminal 100 can maintain the first indicator on the progress bar 10 as it is when the video is played, while the first auxiliary indicator is eliminated only.

Subsequently, as shown in FIG. 6(c), if a video is played until an anticipated point of data capacity excess, the first mobile terminal 100 can display a second indicator 12 indicating that data capacity arrives at a limit. In this case, the second indicator 12 can be displayed on the progress bar 10 in a bar form. And, the second indicator 12 can include a second auxiliary indicator 12_1. As shown in FIG. 6(c), the second auxiliary indicator 12_1 can be displayed on one side among a top, a bottom, a left and a right side of the second indicator 12. And, the second auxiliary indicator 12_1 can indicate a meaning of a point at which the second indicator 12 is displayed. For example, in an embodiment of FIG. 6(c), the second auxiliary indicator 12_1 can display 'data capacity excess point' in a form of a text balloon. Besides, the second auxiliary indicator 12_1 can be displayed in various ways.

Subsequently, although it is not depicted in FIG. 6, if a video is played until an anticipated point of data capacity excess, the first mobile terminal 100 can additionally play a part of the video exceeding data capacity by a configuration of a user or may stop playing the video. Regarding this, it shall be described with reference to FIG. 7 in the following.

When a user watches a video by streaming, the user can easily recognize time on which data capacity exceeds through the embodiment of FIG. 6.

FIG. 7 is a diagram for an example of a menu option displayed according to a playback of a video in a first mobile terminal related to the present invention. More specifically, FIG. 7 shows a menu option for determining whether to play a video exceeding data capacity before the video is played.

As mentioned earlier in FIG. 6, the first mobile terminal 100 can display the first indicator 11 on the progress bar 10 before a video is played. And, the first indicator 11 can include the first auxiliary indicator 11_1. In this case, as shown in FIG. 7(a), the first mobile terminal 100 can sense a first input signal 710 inputted on the first indicator 11. For example, the first input signal 710 can include a short touch input, a long touch input, a multi touch input and the like.

In this case, as shown in FIG. 7(b), the first mobile terminal 100 can display a menu option 13 for determining whether to play a video exceeding data capacity. In particular, if data capacity allocated to the first mobile terminal 100 exceeds while the video is playing, a user can determine whether to continuously play the video in a situation of additional charging via the menu option 13. In relation to this, the first mobile terminal 100 can sense a second input signal 720 inputted on the menu option 13. For example, the second input signal can include a short touch input, a long touch input, a multi touch input and the like.

In one embodiment, as shown in FIG. 7(c), if the second input signal 720 inputted on 'yes' of the menu option 13 is sensed, the first mobile terminal 100 can play a video to the end. In particular, although data capacity allocated to the first mobile terminal 100 exceeds, the first mobile terminal 100 can play the video to the end and finish the video. In another embodiment, as shown in FIG. 7(d), if the second input signal 720 inputted on 'no' of the menu option 13 is sensed, the first mobile terminal 100 can play a video until a data capacity excess point and finish the video. In this case, as shown in FIG. 7(d), the first mobile terminal 100 can display a second indicator (not depicted) indicating the data capacity excess point on the progress bar 10.

Figure 8:
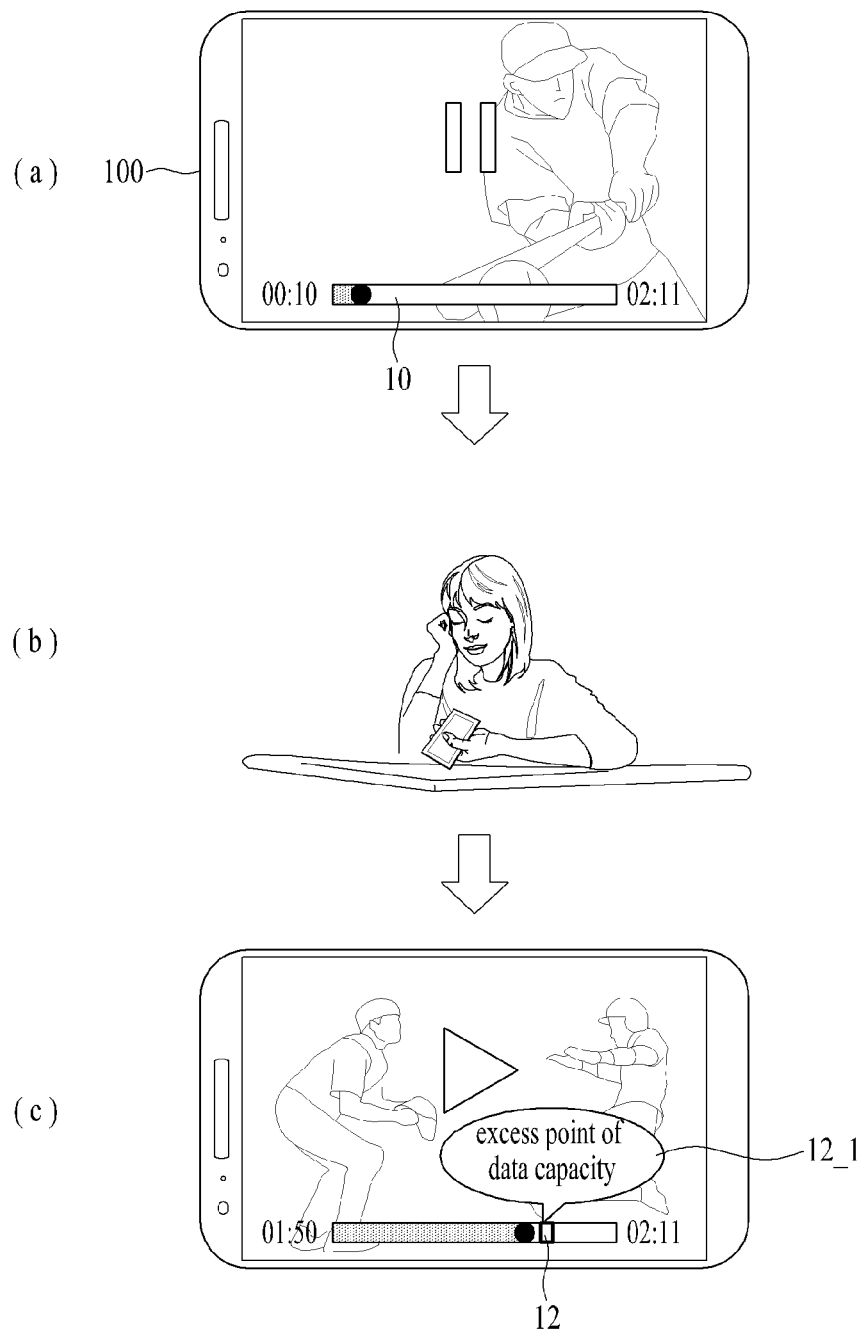
FIG. 8 is a diagram for an example of playing a video according to movement of a user in a first mobile terminal related to the present invention.

FIG. 8 is a diagram for an example of playing a video according to movement of a user in a first mobile terminal related to the present invention.

First of all, as shown in FIG. 8(*a*), the first mobile terminal 100 can play a video. As mentioned earlier in FIG. 6, the first mobile terminal 100 may not display an indicator indicating a data capacity excess point on the progress bar 10 while the video is playing.

Subsequently, as shown in FIG. 8(*b*), the first mobile terminal 100 can sense a movement of a user. More specifically, the first mobile terminal 100 can sense a movement of a user. More specifically, the first mobile terminal 100 can sense a movement of a user while a video is playing. For example, the first mobile terminal 100 can sense a current status of the user using a gyro sensor, an acceleration sensor and the like mounted on the sensing unit. And, for example, the first mobile terminal 100 can sense the current status of the user using a camera. In this case, the current status of the user may correspond to such a status incapable of normally watching a video as a status of exercising, a status of sleeping, a status of drowsing, a status of talking with a different user and the like. In an embodiment of FIG. 8(*b*), the current status of the user may correspond to the status of drowsing.

In this case, in one embodiment, as shown in FIG. 8(*c*), the first mobile terminal 100 can play a video until a data capacity excess point and finish the video. The first mobile terminal 100 can terminate playback of the video based on a movement of a user. For example, if the user is drowsing, the first mobile terminal 100 senses a movement of the user and may be then able to immediately terminate the playback of the video.

FIG. 9 is a diagram for an example of various indicators displayed in a first mobile terminal related to the present invention.

First of all, as mentioned earlier in FIG. 5, the first mobile terminal 100 can perform a pairing with a second mobile terminal (not depicted). And, the first mobile terminal 100 and the second mobile terminal can have data capacity allocated to the first mobile terminal 100 and the second mobile terminal, respectively. In particular, the second mobile terminal (not depicted) can separately use data communication in a mobile communication network as an independent device.

And, as mentioned earlier in FIG. 6, the first mobile terminal 100 can calculate data capacity necessary for playing a video by streaming before the video is played. In particular, if data capacity allocated to the first mobile terminal 100 is less than the data capacity necessary for playing the video by streaming, as shown in FIG. 9(*a*), the first mobile terminal 100 can display an indicator 910 indicating a data capacity excess point of the first mobile terminal 100 on the progress bar 10.

As mentioned in the foregoing description, since the second mobile terminal (not depicted) has data capacity separately allocated to the second mobile terminal irrespective of the data capacity allocated to the first mobile terminal 100, the second mobile terminal can provide or share a communication data insufficient for the video played in the first mobile terminal 100 to/with the first mobile terminal 100. In this case, as shown in FIG. 9(*a*), the first mobile terminal 100 can display an indicator 920 indicating a data capacity excess point of the second mobile terminal (not depicted) on the progress bar 10. Regarding this, it shall be explained again with reference to FIG. 11.

Meanwhile, although not only the data capacity of the first mobile terminal 100 but also the data capacity of the second mobile terminal (not depicted) are used, data capacity necessary for playing a video may be insufficient. Hence, it may be able to receive data capacity from a different user. In this case, as shown in FIG. 9(*b*), the first mobile terminal 100 can display the indicator 910 indicating the data capacity excess point of the first mobile terminal 100, the indicator 920 indicating the data capacity excess point of the second mobile terminal 300 and an indicator 930 indicating an excess point of additional data capacity received from the different user on the progress bar 30. Regarding this, it shall be explained again with reference to FIG. 12 again.

In the following, FIG. 10 to FIG. 13 shows a method for a second mobile terminal 300 to control a video played by a first mobile terminal 100. In FIG. 10 to FIG. 13, assume that the first mobile terminal 100 and the second mobile terminal 300 are paired with each other.

Figure 10:
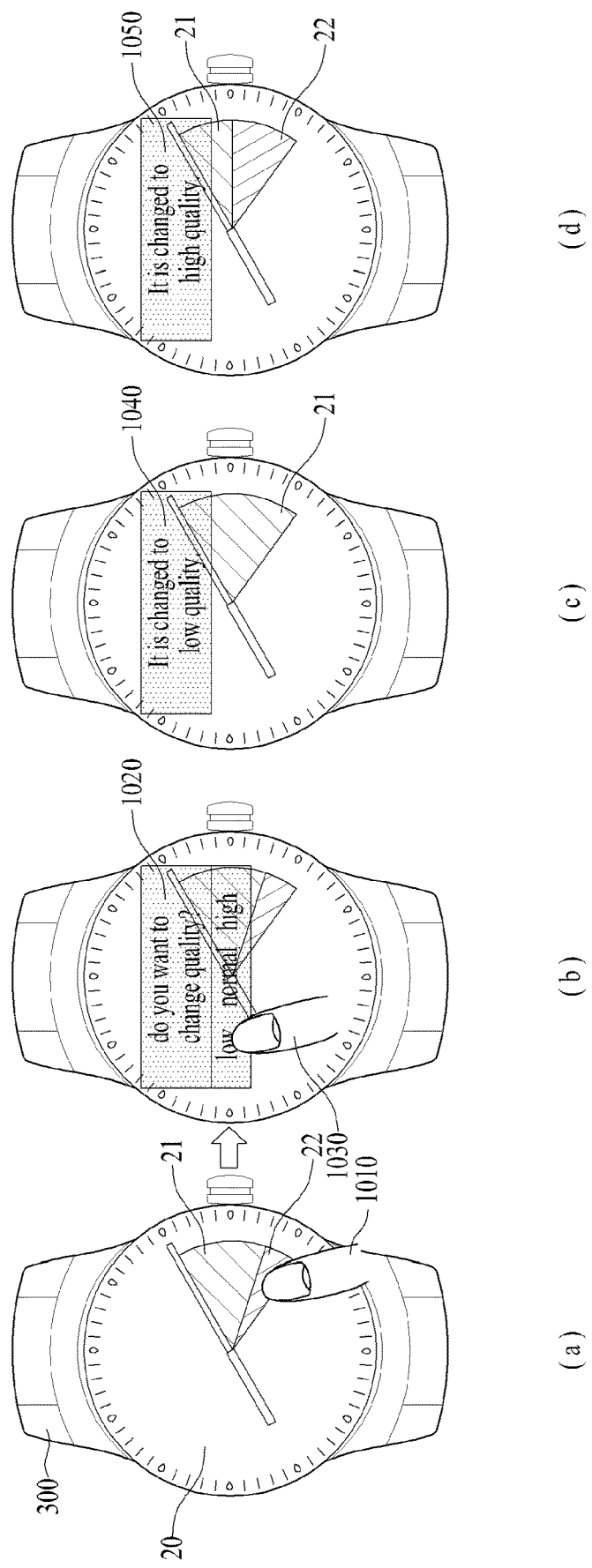
FIG. 10 is a diagram for an example of controlling a video played in a first mobile terminal by a second mobile terminal related to the present invention.

First of all, FIG. 10 is a diagram for an example of controlling a video played in a first mobile terminal by a second mobile terminal related to the present invention. More specifically, FIG. 10 shows a method for the second mobile terminal to control image quality quality of a video played in the first mobile terminal.

First of all, as mentioned earlier in FIG. 5, the second mobile terminal 300 can receive video playback data from the first mobile terminal (not depicted). In this case, the video playback data can include total playback time of a video, data capacity necessary for playing the video by streaming, data capacity allocated to the first mobile terminal and the like.

And, the second mobile terminal 300 can display a first indicator 21 indicating time capable of playing a video using data capacity allocated to the first mobile terminal and a second indicator 22 indicating time of playing the video after the data capacity allocated to the first mobile terminal 100 exceeds on the display unit. In this case, the second mobile terminal 300 can display the first indicator 21 and the second indicator 22 on a watch screen 20 based on current time. In particular, a position on which the first indicator 21 and the second indicator 22 are displayed corresponds to time of which a video is expected to be finished from current time. By doing so, a user can anticipate playback time and playback finish time of a video.

Meanwhile, as shown in FIG. 10(*a*), the second mobile terminal 300 can sense a first input signal 1010 inputted on at least one of the first indicator 21 and the second indicator 22. In this case, the first input signal 1010 can include a short touch input, a long touch input, a multi touch input and the like.

In this case, as shown in FIG. 10(*b*), the second mobile terminal 300 can display a menu option 1020 for changing quality of a video played in the first mobile terminal. In particular, a user can determine the quality of the video played in the first mobile terminal through the menu option 1020. For example, the quality of the video can include low quality, normal quality and high quality. And, the first indicator 21 and the second indicator 22 can be displayed when the quality of the video corresponds to the normal quality. In relation to this, the second mobile terminal 300 can sense a second input signal 1030 inputted on the menu option 1020. For example, the second input signal 1030 can include a short touch input, a long touch input, a multi touch input and the like.

In one embodiment, as shown in FIG. 10(*c*), if the second input signal 1030 selecting 'low quality' is sensed on the menu option 1020, the second mobile terminal 300 can change the quality of the video played in the first mobile terminal into low quality. In this case, if the video is played in low quality, since data amount necessary for playing the video by streaming is reduced, the whole of the video can be played by the data capacity allocated to the first mobile terminal. Hence, as shown in FIG. 10(c), the second mobile terminal 300 can display the first indicator 21 which is increased on the basis of the current time. And, the second mobile terminal 300 can display a pop-up window 1040 for predetermined time to indicate that the quality of the video played in the first mobile terminal is changed to the low quality.

In another embodiment, as shown in FIG. 10(d), if the second input signal 1030 selecting 'high quality' is sensed on the menu option 1020, the second mobile terminal 300 can change the quality of the video played in the first mobile terminal into high quality. In this case, if the video is played in high quality, since data amount necessary for playing the video by streaming increases, an amount of the video capable of being played by the data capacity allocated to the first mobile terminal may decrease. Hence, as shown in FIG. 10(d), the second mobile terminal 300 can display a decreased first indicator 21 and an increased second indicator 22 on the basis of the current time. And, the second mobile terminal 300 can display a pop-up window 1050 for predetermined time to indicate that the quality of the video played in the first mobile terminal is changed to the high quality.

Figure 11:
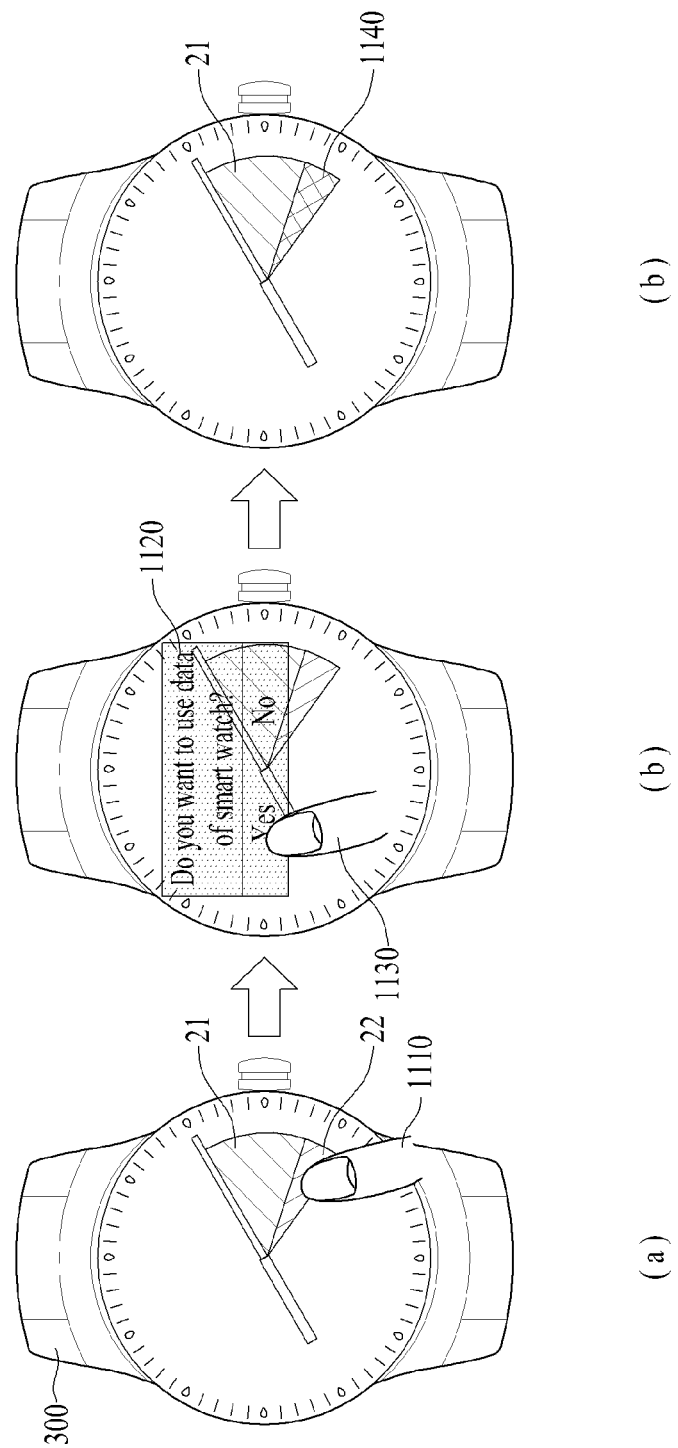
FIG. 11 is a diagram for an example of controlling a video played in a first mobile terminal by a second mobile terminal related to the present invention.

FIG. 11 is a diagram for an example of controlling a video played in a first mobile terminal by a second mobile terminal related to the present invention. More specifically, FIG. 11 shows a method of providing data capacity allocated to the second mobile terminal to the first mobile terminal.

First of all, as shown in FIG. 11(a), the second mobile terminal 300 can display a first indicator 21 indicating time capable of playing a video by data capacity allocated to the first mobile terminal and a second indicator 22 indicating time of playing the video after the data capacity allocated to the first mobile terminal exceeds on the basis of current time. In this case, the second mobile terminal 300 can sense a first input signal 1110 inputted on the second indicator 22.

In this case, as shown in FIG. 11(b), the second mobile terminal 300 can display a menu option 1120 to share data capacity allocated to the second mobile terminal 300, which is allocated irrespective of the data capacity allocated to the first mobile terminal, to play the video. And, the second mobile terminal 300 can sense a second input signal 1130 inputted on the menu option 1120.

In one embodiment, as shown in FIG. 11(b), if the second input signal 1130 selecting 'yes' is sensed on the menu option 1120, the second mobile terminal 300 can provide the data capacity allocated to the second mobile terminal 300 to the playback of the video of the first mobile terminal 100. Hence, as shown in FIG. 11(c), the second indicator 22, which indicates the time of playing the video after the data capacity allocated to the first mobile terminal exceeds, can change to a third indicator 1140 indicating time of playing the video using the data capacity allocated to the second mobile terminal. In this case, as mentioned earlier in FIG. 9(a), the first mobile terminal may display a capacity excess point of the communication data received from the second mobile terminal on the progress bar.

In another embodiment, although it is not depicted in FIG. 11, if the second input signal 1130 selecting 'no' is sensed on the menu option 1120, the second mobile terminal 300 plays the video using the data capacity allocated to the first mobile terminal and may be able to maintain a basic setting configured to charge for an additionally played part as it is.

Figure 12:
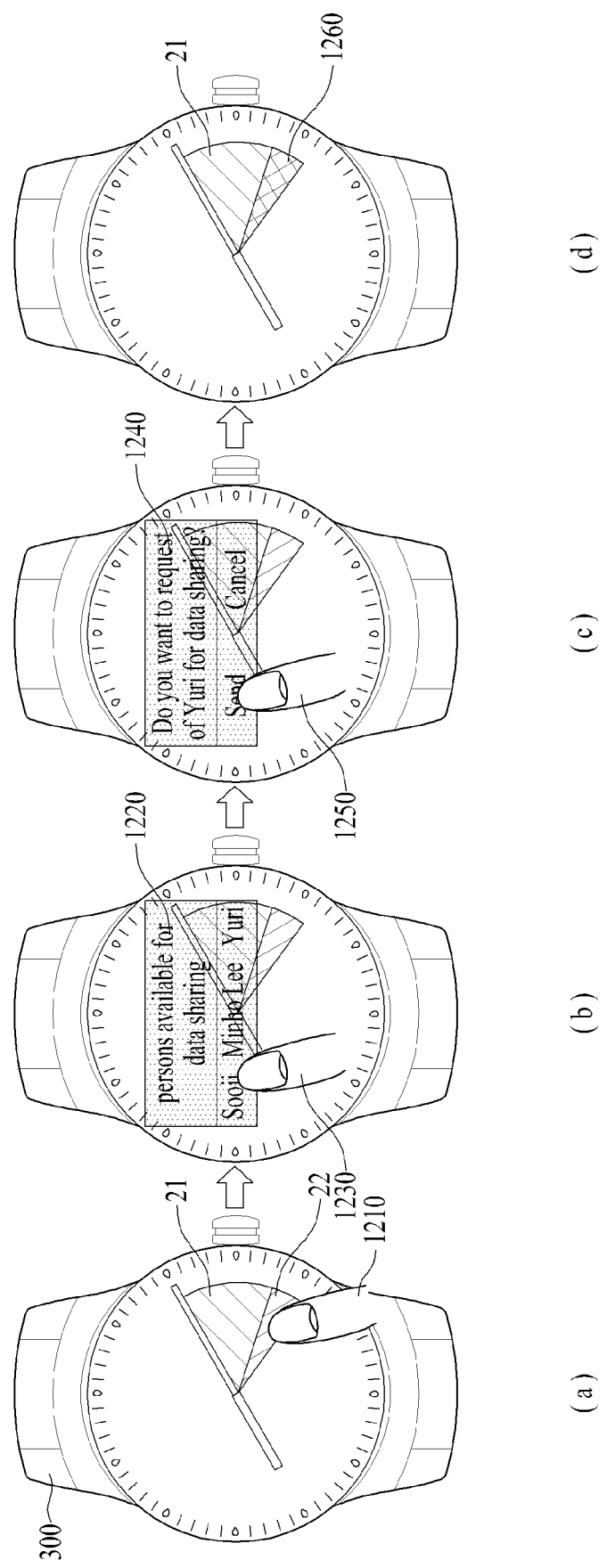
FIG. 12 is a diagram for an example of controlling a video played in a first mobile terminal by a second mobile terminal related to the present invention.

FIG. 12 is a diagram for an example of controlling a video played in a first mobile terminal by a second mobile terminal related to the present invention. More specifically, FIG. 12 shows a method of additionally requesting communication data to a different user.

First of all, as shown in FIG. 12(a), the second mobile terminal 300 can display a first indicator 21 indicating time capable of playing a video by data capacity allocated to the first mobile terminal and a second indicator 22 indicating time of playing the video after the data capacity allocated to the first mobile terminal exceeds on the basis of current time. In this case, the second mobile terminal 300 can sense a first input signal 1210 inputted on the second indicator 22.

In this case, as shown in FIG. 12(b), the second mobile terminal 300 can display a first menu option 1220 for requesting communication data to a different user. In this case, the communication data requested to the different user may correspond to at least a part of data capacity allocated to a mobile terminal of the different user. And, the second mobile terminal 300 can sense a second input signal 1230 inputted on the first menu option 1220.

In this case, the different user displayed on the first menu option 120 may correspond to a user frequently contacted using at least one of the first mobile terminal and the second mobile terminal. And, the different user displayed on the first menu option 120 may correspond to a user located within a predetermined distance from at least one of the first mobile terminal and the second mobile terminal and the user registered at a contact list of a user of the first and the second mobile terminal. For example, in an embodiment of FIG. 12(b), the second input signal 1230 may correspond to an input signal inputted on 'Yuri'.

Subsequently, as shown in FIG. 12(c), the second mobile terminal can display a second menu option 1240 to determine whether to send a request message to the different user selected based on the first menu option 1220. And, as shown in FIG. 12(c), the second mobile terminal can sense a third input signal 1250 inputted on the second menu option 1240. Hence, the second mobile terminal can send a message to 'Yuri' to request provision of communication data.

Meanwhile, in an embodiment of FIG. 12(b), if the second mobile terminal senses the second input signal 1230 inputted on the first menu option 1220, the second mobile terminal can directly send a message for requesting data to the different user without displaying the second menu option 1240.

Subsequently, the second mobile terminal 300 can additionally receive communication data from the different user via the data request message. In this case, as shown in FIG. 12(d), the second mobile terminal 300 can display a third indicator 1260 indicating time of playing a video using the communication data received from the different user instead of the second indicator 22 indicating the time of playing the video after the data capacity allocated to the first mobile terminal exceeds. In this case, as mentioned earlier in FIG. 9(b), the first mobile terminal can display an indicator indicating an excess point of an additional data capacity on the progress bar.

Figure 13:
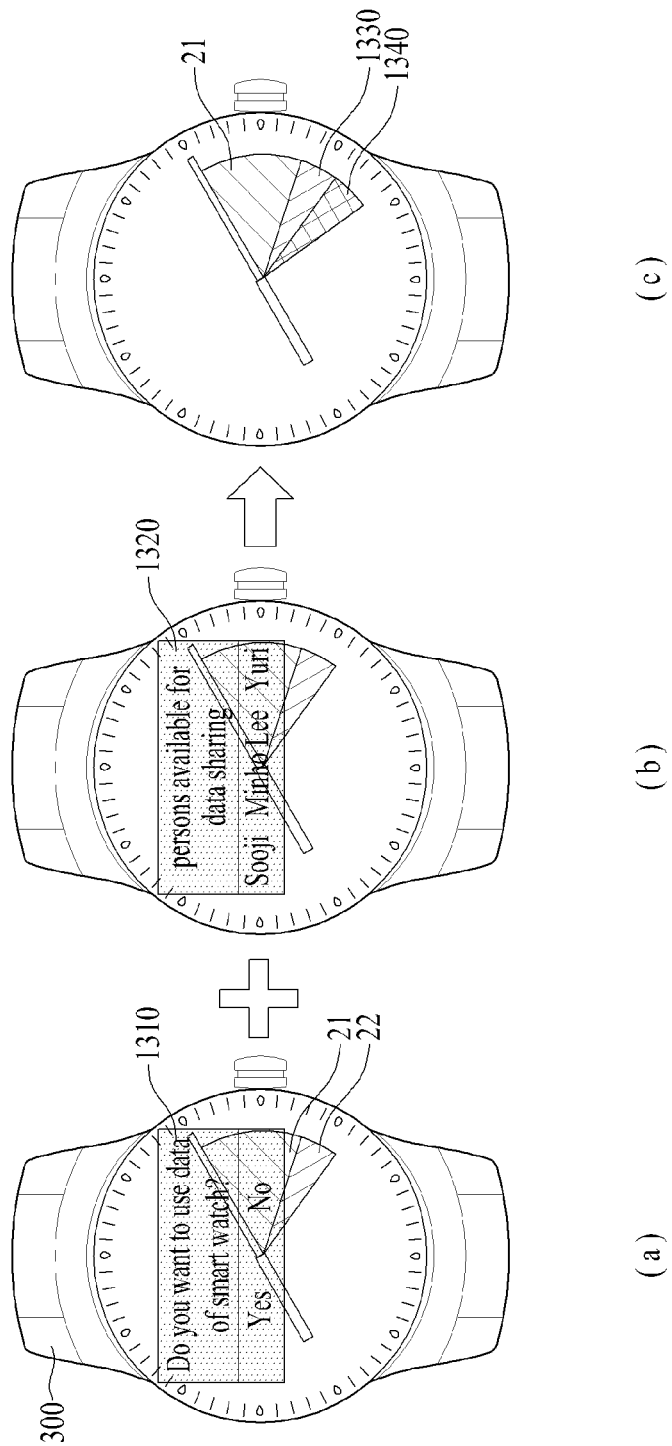
FIG. 13 is a diagram for an example of controlling a video played in a first mobile terminal by a second mobile terminal related to the present invention.

FIG. 13 is a diagram for an example of controlling a video played in a first mobile terminal by a second mobile terminal related to the present invention. More specifically, FIG. 13 shows a method of securing communication data insufficient for playing a video in the first mobile terminal in case that an input signal inputted on the second mobile terminal is sensed.

First of all, the second mobile terminal 300 can display a first indicator 21 indicating time capable of playing a video by data capacity allocated to the first mobile terminal and a second indicator 22 indicating time of playing the video after the data capacity allocated to the first mobile terminal exceeds on the basis of current time.

In this case, as shown in FIG. 13(*a*), the second mobile terminal 300 can display a menu option 1310 to share data capacity allocated to the second mobile terminal 300. More specifically, as mentioned earlier in FIG. 11, if an input signal inputted on the second indicator 22 is sensed, the second mobile terminal 300 can display the menu option 1310. By doing so, it is able to configure a user to use not only data capacity allocated to the first mobile terminal but also data capacity allocated to the second mobile terminal in a mobile communication network.

And, as shown in FIG. 13(*b*), the second mobile terminal 300 can display a menu option 1320 for requesting data capacity to a different user. More specifically, as mentioned earlier in FIG. 12, if an input signal inputted on the second indicator 22 is sensed, the second mobile terminal 300 can display the menu option 1320. By doing so, a user can request not only the data capacity allocated to the second mobile terminal but also data capacity allocated to a mobile terminal of the different user.

In the aforementioned menu option 1310/1320, if the data capacity allocated to the second mobile terminal and additional data capacity requested to the different user are secured, the second mobile terminal 300 can change indicators displayed on a watch screen. In particular, as shown in FIG. 13(*c*), the second mobile terminal can display a first indicator 21 indicating time capable of playing a video using the data capacity allocated to the first mobile terminal, a third indicator 1330 indicating time capable of playing the video using the data capacity allocated to the second mobile terminal and a fourth indicator 1340 indicating time capable of playing the video using the data capacity received from the different user.

In this case, the sum of the time indicated by the first indicator 21, the third indicator 1330 and the fourth indicator 1340 may be identical to the sum of the time indicated by the first indicator 21 and the second indicator 22 shown in FIG. 13(*a*) and FIG. 13(*b*).

Figure 14:
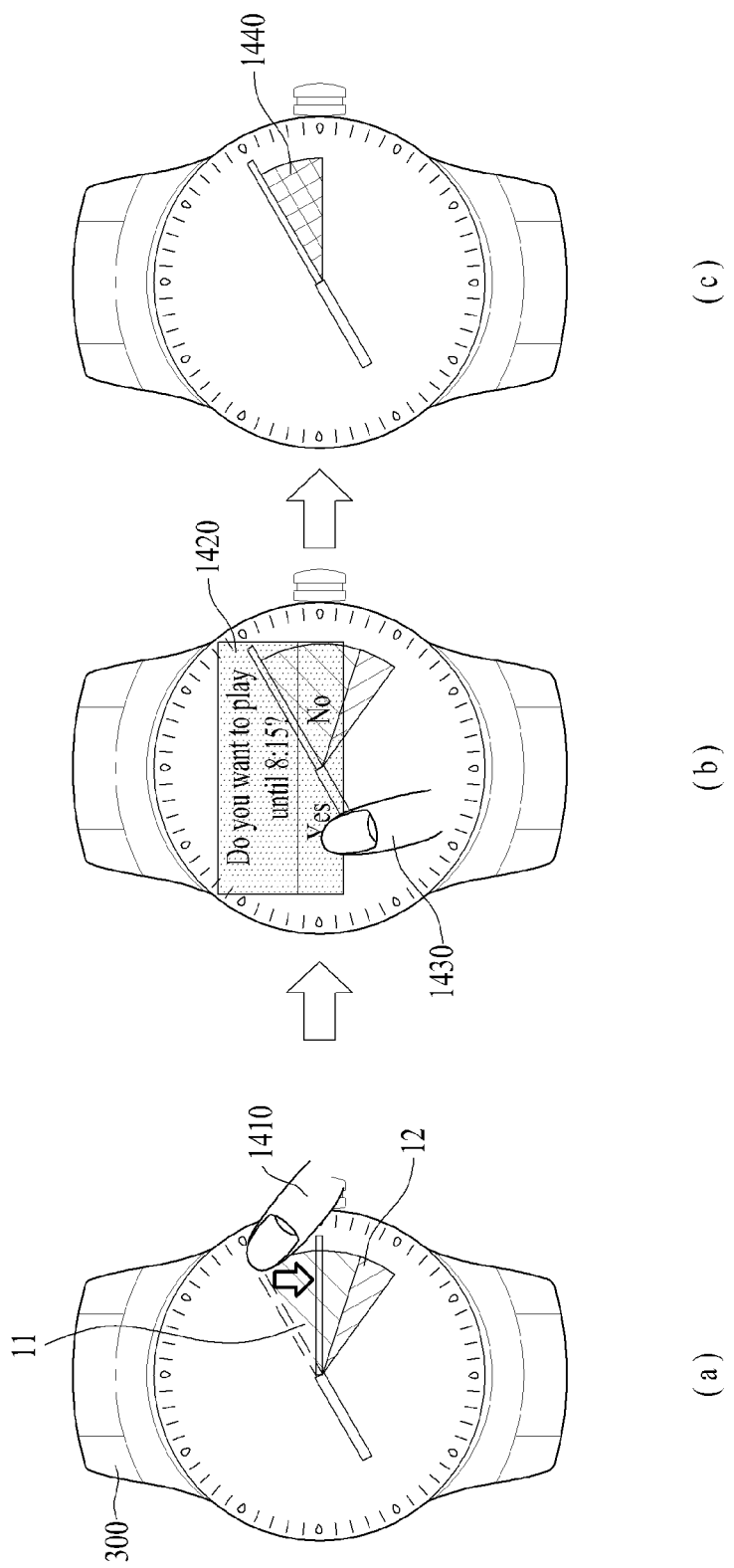
FIG. 14 is a diagram for an example of controlling a video played in a first mobile terminal by a second mobile terminal related to the present invention.

FIG. 14 is a diagram for an example of controlling a video played in a first mobile terminal by a second mobile terminal related to the present invention. More specifically, FIG. 14 shows a method of controlling a length of a video played in the first mobile terminal in case that an input signal inputted on the second mobile terminal is sensed.

First of all, as shown in FIG. 14(*a*), the second mobile terminal 300 can display a first indicator 21 indicating time capable of playing a video by data capacity allocated to the first mobile terminal and a second indicator 22 indicating time of playing the video after the data capacity allocated to the first mobile terminal exceeds on the basis of current time. In this case, the second mobile terminal 300 can sense a first input signal 1410 inputted on a minute hand indicating current time. In this case, the first input signal 1410 may correspond to a flicking touch input or a drag touch input. In an embodiment of FIG. 14(*a*), the first input signal 1410 may correspond to a drag input dragging the minute hand of a watch to 15 minutes from 10 minutes.

In this case, as shown in FIG. 14(*b*), the second mobile terminal 300 can display a menu option 1420 for determining whether to play a video until time corresponding to a position at the first input signal 1410 is stopped. And, the second mobile terminal 300 can sense a second input signal 1430 inputted on the menu option 1420.

In one embodiment, as shown in FIG. 14(*b*), if the second input signal 1430 selecting 'yes' is sensed on the menu option 1420, the second mobile terminal 300 can control a video played in the first mobile terminal to be played until the time at which the first input signal 1410 is stopped. For example, the second mobile terminal 300 can transmit a signal controlling a video to be played for 5 minutes and stopped to the first mobile terminal. And, for example, as shown in FIG. 14(*c*), the second mobile terminal 300 can delete the second indicator 22 displayed on a watch screen and change a size of the first indicator 21. This is because, if a video is played until a position designated by a user only, it is sufficient enough to play the video by streaming using the data capacity allocated to the first mobile terminal.

In another embodiment, if the second input signal 1430 selecting 'no' is sensed on the menu option 1420, the second mobile terminal 300 can control a video played in the first mobile terminal to be played to the end instead of until the time at which the first input signal 1410 is stopped. In particular, when a user operates the second mobile terminal, if the user puts an input of moving a position of a minute hand by mistake, the user may be able to double check the input in the menu option 1420 and may be then able to control the whole of the video to be played instead of a part of the video. In this case, as mentioned earlier in FIG. 11 and FIG. 12, in order to play a part of the video incapable of being played by the data capacity allocated to the first mobile terminal, the second mobile terminal may use data capacity allocated to the second mobile terminal or may receive data capacity from a different user.

Meanwhile, as shown in FIG. 14(*a*), if a first input signal 1410 inputted on the minute hand is sensed, the second mobile terminal 300 does not separately check the first input signal via the menu option 1420 shown in FIG. 14(*b*) and, as shown in FIG. 14 (*c*), the second mobile terminal 300 may be able to directly control the video played in the first mobile terminal.

FIG. 15 is a diagram for an example of controlling a video played in a first mobile terminal by the first mobile terminal or a second mobile terminal related to the present invention.

As mentioned in the foregoing description, the first mobile terminal 100 can play a video. For example, in an embodiment of FIG. 15, the first mobile terminal may be in a state of displaying a first screen of the video before the video is played. In this case, the first mobile terminal 100 can sense a first input signal 1510 for calculating data capacity necessary for playing the video by streaming. In this case, the first input signal 1510 may correspond to a long touch input. This is aimed for distinguishing an input signal (e.g., a short touch input) for video playback from an input signal for calculating data capacity.

Subsequently, the first mobile terminal 100 can transmit video playback information to the second mobile terminal 300. As mentioned in the foregoing description, the video playback information can include total playback time of a video, data capacity necessary for playing a video, data capacity allocated to the first mobile terminal and the like. And, the second mobile terminal 300 can receive the video playback information.

In this case, the second mobile terminal 300 can display a part of a video capable of being played by the data capacity allocated to the first mobile terminal among the video to be played in the first mobile terminal on the display unit based on the video playback information. In one embodiment, the second mobile terminal 300 can display time capable of playing a video by the data capacity allocated to the first mobile terminal. As shown in FIG. 15(*a*), the second mobile terminal 300 can display a first indicator 21 indicating time capable of playing a video by the data capacity allocated to the first mobile terminal and a second indicator 22 indicating time of playing the video after the data capacity allocated to the first mobile terminal exceeds on a watch screen 20 on the basis of current time. In this case, the time indicated by the second indicator 22 may correspond to time incapable of playing the video using the data capacity allocated to the first mobile terminal. This may correspond to an indicator identical to the first indicator 21 and the second indicator 22 mentioned earlier in FIG. 10 to FIG. 14.

In another embodiment, the second mobile terminal 300 can display a part capable of being played by the data capacity allocated to the first mobile terminal as a data capacity. As shown in FIG. 15(b), the second mobile terminal 300 can display a third indicator 31 indicating a part capable of being played by the data capacity allocated to the first mobile terminal and a fourth indicator 32 indicating a part incapable of being played by the data capacity allocated to the first mobile terminal.

FIG. 16 is a diagram for an example of controlling a video played in a first mobile terminal by the first mobile terminal or a second mobile terminal related to the present invention.

More specifically, FIG. 16 shows a method for the second mobile terminal to control a plurality of videos in case that a plurality of the videos are expected to be sequentially played in the first mobile terminal.

First of all, as shown in FIG. 16(a), the first mobile terminal 100 can display a list 1610 of a plurality of videos expected to be played in the first mobile terminal. For example, the first mobile terminal 100 can display a currently displayed video or a video expected to be firstly played among a plurality of the videos on the top and may be able to display a list of the remaining videos at the bottom. In an embodiment of FIG. 16(a), since a first video corresponds to a video expected to be played, the first video is displayed at the top. Since a second video to a fourth video correspond to videos to be played after the first video, the second video to the fourth video can be displayed at a video list.

In this case, the first mobile terminal 100 can transmit video playback information to the second mobile terminal 300. In an embodiment of FIG. 16, the video playback information can include playback time of each of a plurality of the videos, data capacity necessary for playing each of a plurality of the videos by streaming and data capacity allocated to the first mobile terminal 100. And, the second mobile terminal 300 can receive the video playback information from the first mobile terminal 100.

Subsequently, the second mobile terminal 300 can display playback information of a plurality of the videos on a watch screen on the basis of current time. More specifically, the second mobile terminal 300 can display a first indicator 21 indicating an indicator 1530, which indicates playback time of each of a plurality of the videos, and time capable of playing a video by the data capacity allocated to the first mobile terminal and a second indicator 22 indicating time incapable of playing the video by the data capacity allocated to the first mobile terminal. Referring to FIG. 15(b), a user can easily recognize that a first video and a second video are playable by the data capacity allocated to the first mobile terminal and a part of a third video and a fourth video are not playable by the data capacity allocated to the first mobile terminal.

Figure 17:
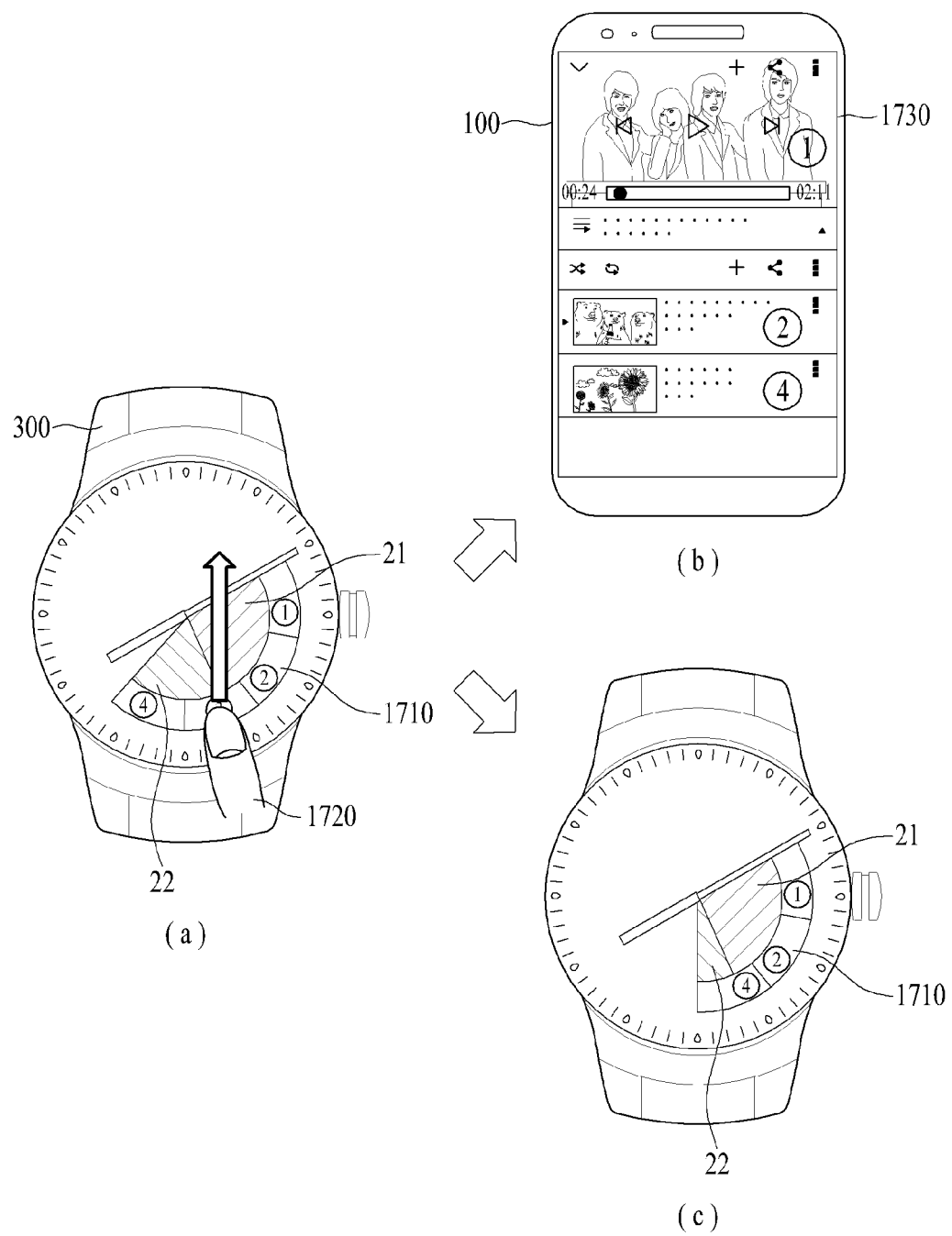
FIG. 17 is a diagram for an example of controlling a video played in a first mobile terminal by the first mobile terminal or a second mobile terminal related to the present invention.

FIG. 17 is a diagram for an example of controlling a video played in a first mobile terminal by the first mobile terminal or a second mobile terminal related to the present invention.

More specifically, FIG. 17 shows a method of controlling a video played in the first mobile terminal according to an input signal inputted on the second mobile terminal in case that a plurality of the videos depicted in FIG. 16 are expected to be played.

First of all, as mentioned earlier in FIG. 16, if a plurality of videos are played in the first mobile terminal 100, the second mobile terminal 300 can display playback information of a plurality of the videos on a watch screen on the basis of current time. In this case, since a first video and a second video correspond to a first indicator 21, the first and the second video can be played by data capacity allocated to the first mobile terminal 100. And, since a part of a third video and a fourth video correspond to a second indicator 22, a part of the third video and the fourth video are unable to be played by the data capacity allocated to the first mobile terminal 100.

In this case, the second mobile terminal 300 can sense a first input signal inputted on an indicator 1710 indicating playback time of each of a plurality of the videos. In this case, the first input signal 1720 may correspond to a drag touch input or a flicking touch input inputted on one side among a top, a bottom, a left and a right side. And, in an embodiment of FIG. 17(a), the first input signal 1720 may correspond to a signal for eliminating a third video from a play list in which a plurality of the videos are included.

In this case, the second mobile terminal 300 can transmit information on the first input signal to the first mobile terminal 100. Hence, as shown in FIG. 17(b), the first mobile terminal can eliminate the third video from the video list including a plurality of the videos. Hence, the first mobile terminal 100 can display the first video, the second video and the fourth video on a list 1730 of videos expected to be played.

And, as shown in FIG. 17(c), the second mobile terminal 300 can delete the third video from the indicator 1710 indicating the playback time of each of a plurality of the videos. Hence, the second mobile terminal can display the indicator 1710 indicating the first, the second and the fourth video, the first indicator 21 and the second indicator 22 according to a result of the first input signal 1720.

Figure 18:
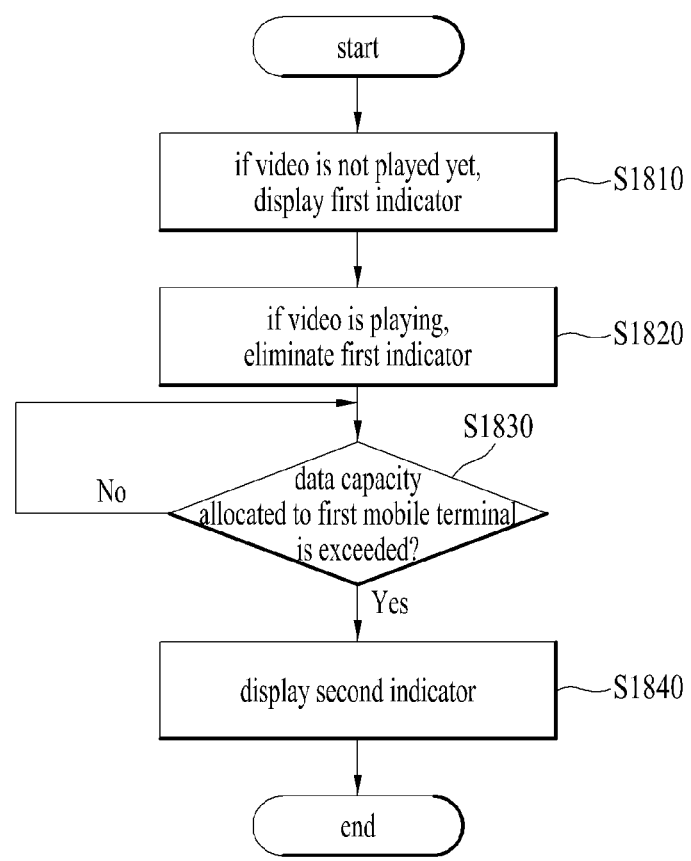
FIG. 18 is a flowchart for a method of controlling a first mobile terminal related to the present invention.

FIG. 18 is a flowchart for a method of controlling a first mobile terminal related to the present invention. Each step of FIG. 18 described in the following can be controlled by the controller of the mobile terminal depicted in FIG. 1.

First of all, before a video is played, the first mobile terminal can display a first indicator [S1810]. In this case, the first indicator can indicate an anticipated excess point of data capacity allocated to the first mobile terminal. In this case, the data capacity may correspond to capacity of communication data capable of being used by the first mobile terminal in a mobile communication network. And, the anticipated excess point of the data capacity may correspond to a point at which the data capacity allocated to the first mobile terminal exceeds when a video is played by streaming.

Subsequently, in case of playing a video, the first mobile terminal can eliminate a first indicator [S1820]. In this case, the step S1820 can be omitted by a configuration of a user.

Subsequently, the first mobile terminal can determine whether the data capacity allocated to the first mobile terminal exceeds while a video is playing [S1830].

In the step of S1830, if the data capacity allocated to the first mobile terminal exceeds, the first mobile terminal can display a second indicator [S1840]. In this case, the second indicator can indicate a point at which the data capacity allocated to the first mobile terminal exceeds. And, a position on which the first indicator is displayed and a position on which the second indicator is displayed may be identical to each other on a progress bar.

Figure 19:
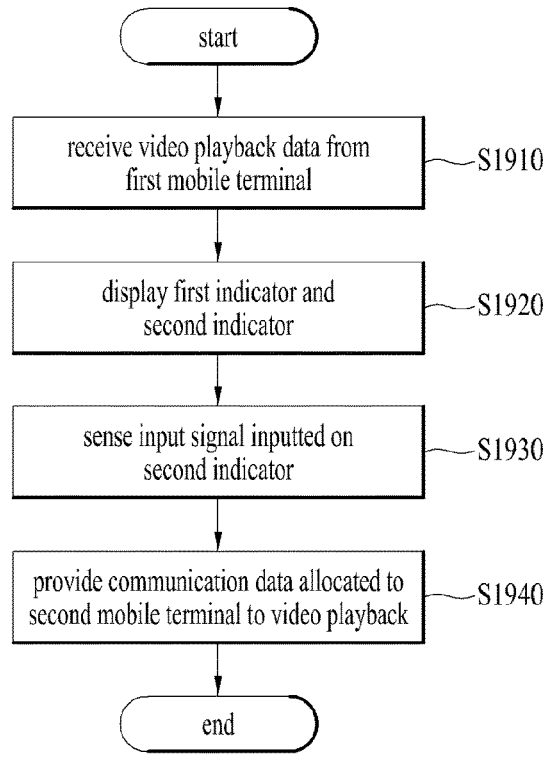
FIG. 19 is a flowchart for a method of controlling a second mobile terminal related to the present invention.

FIG. 19 is a flowchart for a method of controlling a second mobile terminal related to the present invention. Each step of FIG. 19 described in the following can be controlled by the controller of the mobile terminal depicted in FIG. 1.

First of all, the second mobile terminal can receive video playback data from the first mobile terminal [S1910]. In this case, the video playback data can include playback time of a video played in the first mobile terminal, capacity of communication data necessary for playing the video and information on the capacity of the communication data allocated to the first mobile terminal.

Subsequently, the second mobile terminal can display a first indicator and a second indicator based on the received video playback data [S1920]. As mentioned earlier in FIG. 10, the second mobile terminal can display the first indictor and the second indicator on the basis of current time. And, the first indictor can indicate time capable of playing a video using the data capacity allocated to the first mobile terminal paired with the second mobile terminal. And, the second indicator can indicate time of playing a video after the data capacity allocated to the first mobile terminal exceeds.

Subsequently, the second mobile terminal can sense an input signal inputted on the second indicator [S1930]. In this case, the input signal can include a short touch, a long touch, a multi touch and the like.

Subsequently, the second mobile terminal can provide communication data allocated to the second mobile terminal to video playback [S1940]. In this case, as mentioned earlier in FIG. 11, the second mobile terminal eliminates the second indicator and can display a third indicator indicating time capable of playing a video using data capacity allocated to the second mobile terminal.

Figure 20:
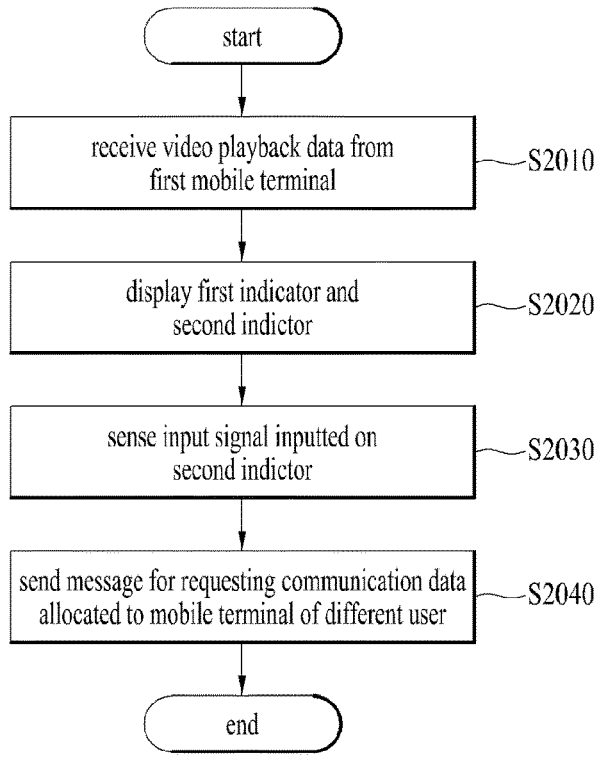
FIG. 20 is a flowchart for a method of controlling a second mobile terminal related to the present invention.

FIG. 20 is a flowchart for a method of controlling a second mobile terminal related to the present invention. Each step of FIG. 20 described in the following can be controlled by the controller of the mobile terminal depicted in FIG. 1. Among contents explained in FIG. 20, explanation on contents overlapped with embodiment of FIG. 19 is omitted at this time.

First of all, the second mobile terminal can receive video playback data from the first mobile terminal [S2010]. Subsequently, the second mobile terminal can display a first indicator and a second indicator based on the received video playback data [S2020]. Subsequently, the second mobile terminal can sense an input signal inputted on the second indicator [S2030].

Subsequently, the second mobile terminal can send a message for requesting communication data allocated to a mobile terminal of a different user [S2040]. In this case, as mentioned earlier in FIG. 12, the second mobile terminal eliminates the second indicator and may be able to display a third indicator indicating time capable of playing a video based on at least a part of received data capacity among the data capacity allocated to the mobile terminal of the different user.

Meanwhile, as mentioned earlier in FIG. 13, the second mobile terminal can provide the data capacity allocated to the second mobile terminal and at least a part of the received data capacity among the data capacity allocated to the mobile terminal of the different user to a video expected to be played in the first mobile terminal.

Advantageous effects of a watch-type mobile terminal according to the present invention and a method of controlling therefor are explained in the following.

According to at least one or more embodiments of the present invention, a user can identify a section incapable of playing a video by streaming using data capacity allocated to a mobile terminal before the video is played in the mobile terminal.

According to at least one or more embodiments of the present invention, a user can change quality of a video expected to be played in a mobile terminal using a watch-type mobile terminal paired with the mobile terminal or provide data capacity allocated to the watch-type mobile terminal to playback of the video.

According to at least one or more embodiments of the present invention, a user can request and receive data capacity insufficient for playing a video expected to be played in a mobile terminal using a watch-type mobile terminal paired with the mobile terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising: a touch screen; a sensor configured to detect a touch input by the user selecting the option to continue playing the video, an antenna configured to communicate with an external device; and a controller, wherein the controller is configured to: receive video playback data from the external device, the video playback data comprising total playback time of a video by streaming on the external device, data capacity necessary for playing the video by streaming on the external device and information indicating an amount of data capacity allocated to the external device, display a first indicator indicating an amount of time for playing a first portion of the video by streaming using the data capacity allocated to the external device and a second indicator indicating an amount of time for playing a second portion of the video by streaming after the external device exceeds the data capacity allocated to the external device, in response to the sensor detecting a first touch input to the first indicator or the second indicator displayed on the touch screen, display a menu option for changing the quality of the video played on the external device, and in response to the sensor detecting a second touch input to the menu option for changing the quality of the video, modify the first indicator and the second indicator and display the modified first indicator or the modified second indicator based on the changed quality of the video.

2. The mobile terminal of claim 1, wherein the controller is further configured to determine the anticipated point at which the mobile terminal is expected to exceed the communication data capacity allocated to the mobile terminal by the mobile communication network based on the controller streaming the video.

3. The mobile terminal of claim 1, wherein the controller is further configured to remove the display of the first indicator when playing the video.

4. The mobile terminal of claim 1, wherein the position along the progress bar at which the first indicator is displayed is identical to the position at which the second indicator is displayed.

5. The mobile terminal of claim 1, wherein the controller is further configured to display a menu on the touch screen, the menu providing a user with an option to continue playing the video after the mobile terminal exceeds the communication data capacity allocated to the mobile terminal by the mobile communication network.

6. The mobile terminal of claim 1 further comprising: a sensor configured to detect a predetermined user movement, and wherein the controller is further configured to terminate the playing of the video based on the sensor detecting the predetermined user movement.

7. The mobile terminal of claim 1, wherein the controller is further configured to display, the first indicator together with a third indicator indicating an anticipated point at which the external device is expected to exceed an amount of communication data capacity allocated to the external device.

8. The mobile terminal of claim 1, wherein the mobile terminal is configured to use an amount of communication data capacity allocated to a second external device, and wherein the controller is further configured to display, a third indicator indicating an anticipated point at which the mobile terminal is expected to exceed the communication data capacity allocated to the mobile terminal plus additional communication data capacity allocated to the second external device.

9. The mobile terminal of claim 8, wherein the second external device is associated with a user different from the user associated with the mobile terminal and the external device.

10. The mobile terminal of claim 1, wherein the controller is further configured to transmit, through the antenna, video playback data to the external device, wherein the video playback data is necessary for playing the video by streaming and wherein the video playback data comprises total playback time on the mobile terminal, communication data capacity necessary for playing the video, and information indicating the communication data capacity allocated to the mobile terminal.

11. A watch-type mobile terminal comprising: a touch screen; a sensor; an antenna configured to communicate with an external device; and a controller, wherein the controller is configured to: receive video playback data from the external device, the video playback data comprising total playback time of a video by streaming on the external device, communication data capacity necessary for playing the video on the external device and information indicating an amount of communication data capacity allocated to the external device, and display a first indicator indicating an amount of time for playing a first portion of the video by streaming using the communication data capacity allocated to the external device and a second indicator indicating an amount of time for playing a second portion of the video by streaming after the external device exceeds the communication data capacity allocated to the external device, in response to the sensor detecting a first touch input to the first indicator or the second indicator displayed on the touch screen, display a menu option for changing the quality of the video played on the external device, in response to the sensor detecting a second touch input to the menu option for changing the quality of the video, modify the first indicator and the second indicator and display the modified first indicator or the modified second indicator based on the changed quality of the video wherein the communication data capacity allocated to the external device corresponds to an amount of communication data to which the external device is limited by a mobile communication network.

12. The watch-type mobile terminal of claim 11, wherein the controller is further configured to display the first indicator and the second indicator on the touch screen such that the first indicator begins at the current time displayed on the watch-type mobile terminal and the second indicator begins at the end of the first indicator.

13. The watch-type mobile terminal of claim 11, wherein the controller, in response to the sensor detecting a first touch input to the second indicator displayed on the touch screen, is further configured to display a menu option for selecting whether communication data capacity allocated to the watch-type mobile terminal is to be used to play at least a portion of the video on the external device.

14. The watch-type mobile terminal of claim 13, wherein the controller is further configured to display a third indicator indicating an amount of time for playing at least a portion of the video using the communication data capacity allocated to the watchtype mobile terminal.

15. The watch-type mobile terminal of claim 11, wherein in response to the sensor detecting a first touch input, the controller, is further configured to display a menu option for sending a message requesting permission to use communication data capacity allocated to a second external device.

16. The watch-type mobile terminal of claim 15, wherein the controller is further configured to display a third indicator indicting an amount of time for playing at least a portion of the video using communication data capacity received from the second external device.

17. The watch-type mobile terminal of claim 16, wherein the second external device is associated with a user different from the user associated with the watch-type mobile terminal and the external device.

18. The watch-type mobile terminal of claim 11, wherein the sensor is configured to detect a change in position of a touch input on the touch screen, and wherein the controller is further configured to determine an amount of time for playing at least a portion of the video in response to the change in position of the touch input detected by the sensor.

19. The watch-type mobile terminal of claim 11, wherein the controller is further configured, in response to receiving video playback data for each of a plurality of videos, to display a third indictor indicating an amount of time for playing each of the plurality of the videos.

20. The watch-type mobile terminal of claim 19, wherein the controller is further configured to display the third indicator as a plurality of segments, and wherein each of the plurality of segments indicates an amount of time for playing a corresponding one of the plurality of videos.

21. The watch-type mobile terminal of claim 20, wherein a first one of the segments begins at the current time appearing on the touch screen of the watch-type mobile terminal and each of the remaining segments begins where the previous segment ends.

22. The watch-type mobile terminal of claim 21, wherein the sensor is configured to detect a touch input applied to a selected one of the plurality of segments, and wherein the controller is further configured to eliminate the one video corresponding to the selected segment and to transmit a signal to the external device to eliminate the one video.

\* \* \* \* \*